(12) United States Patent
Padmanabhan

(10) Patent No.: US 12,099,496 B2
(45) Date of Patent: Sep. 24, 2024

(54) DATABASE SYSTEM PUBLIC TRUST LEDGER CONTRACT LINKAGE

(71) Applicant: Salesforce, Inc., San Francisco, CA (US)

(72) Inventor: Prithvi Krishnan Padmanabhan, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 134 days.

(21) Appl. No.: 17/412,056

(22) Filed: Aug. 25, 2021

(65) Prior Publication Data

US 2023/0038497 A1    Feb. 9, 2023

Related U.S. Application Data

(60) Provisional application No. 63/230,293, filed on Aug. 6, 2021.

(51) Int. Cl.
*G06F 16/23* (2019.01)
*G06F 9/30* (2018.01)
(Continued)

(52) U.S. Cl.
CPC ............ *G06F 16/2379* (2019.01); *G06F 9/30* (2013.01); *H04L 9/088* (2013.01); *H04L 9/30* (2013.01); *H04L 9/50* (2022.05)

(58) Field of Classification Search
None
See application file for complete search history.

(56) References Cited

U.S. PATENT DOCUMENTS

| 10,585,657 B2 | 3/2020 | Padmanabhan |
| 10,701,054 B2 | 6/2020 | Padmanabhan et al. |

(Continued)

FOREIGN PATENT DOCUMENTS

| AU | 2019345039 A1 | 4/2021 |
| AU | 2019345040 A1 | 4/2021 |

(Continued)

OTHER PUBLICATIONS

Padmanabhan, Prithvi Krishnan et al., "Database System Public Trust Ledger Contract Linkage", U.S. Appl. No. 17/412,059, filed Aug. 25, 2021.

(Continued)

*Primary Examiner* — Polina G Peach
(74) *Attorney, Agent, or Firm* — Polygon IP, LLP

(57) ABSTRACT

A request may be received to access a digital asset uniquely identified by an identifier within an on-demand database system configured to provide computing services to a plurality of entities via the internet. Ownership of the digital asset may be determined based on ownership of a designated smart contract recorded in a public trust ledger. A plurality of related smart contracts recorded in the public trust ledger may be identified. Each of the related smart contracts may be linked with the designated smart contract. Two or more of the smart contracts may each include a respective one or more non-fungible tokens related to the digital asset. A respective state for two or more of a plurality of modifiable values may be determined. Each of the modifiable values may be being stored within a respective one of the plurality of related smart contracts within the public trust ledger.

19 Claims, 22 Drawing Sheets

(51) Int. Cl.
*H04L 9/00* (2022.01)
*H04L 9/08* (2006.01)
*H04L 9/30* (2006.01)

(56) References Cited

U.S. PATENT DOCUMENTS

| | | | |
|---|---|---|---|
| 10,915,891 B1 | 2/2021 | Winklevoss | |
| 11,038,771 B2 | 6/2021 | Padmanabhan | |
| 11,082,226 B2 | 8/2021 | Hildebrand | |
| 11,128,465 B2 | 9/2021 | Hildebrand | |
| 11,144,335 B2 | 10/2021 | Padmanabhan | |
| 11,157,484 B2 | 10/2021 | Padmanabhan | |
| 11,200,569 B1 | 12/2021 | James | |
| 11,244,313 B2 | 2/2022 | Padmanabhan | |
| 11,288,280 B2 | 3/2022 | Padmanabhan | |
| 11,288,736 B1 | 3/2022 | Jette | |
| 11,308,487 B1 | 4/2022 | Foster | |
| 11,315,138 B1 | 4/2022 | Olson | |
| 11,315,193 B1* | 4/2022 | Kim | G06Q 20/3678 |
| 11,334,883 B1 | 5/2022 | Auerbach | |
| 11,372,635 B2 | 6/2022 | Padmanabhan | |
| 11,379,429 B1* | 7/2022 | Lupowitz | G06F 16/1805 |
| 11,430,066 B2 | 8/2022 | Doney | |
| 11,431,486 B2 | 8/2022 | Padmanabhan | |
| 11,431,693 B2 | 8/2022 | Padmanabhan | |
| 11,468,406 B2 | 10/2022 | Padmanabhan | |
| 11,468,431 B2* | 10/2022 | Williams | G06Q 20/40 |
| 11,469,886 B2 | 10/2022 | Padmanabhan | |
| 11,488,176 B2 | 11/2022 | Padmanabhan | |
| 11,611,560 B2 | 3/2023 | Padmanabhan | |
| 11,671,531 B1 | 6/2023 | Mudireddy | |
| 11,743,137 B2 | 8/2023 | Padmanabhan | |
| 11,764,950 B2 | 9/2023 | Padmanabhan | |
| 11,770,445 B2 | 9/2023 | Padmanabhan | |
| 11,783,024 B2 | 10/2023 | Padmanabhan | |
| 2011/0246460 A1 | 10/2011 | Hsieh | |
| 2015/0213443 A1 | 7/2015 | Geffon | |
| 2016/0192165 A1 | 6/2016 | Agulnik | |
| 2016/0260169 A1 | 9/2016 | Arnold | |
| 2017/0214522 A1 | 7/2017 | Code | |
| 2017/0242887 A1 | 8/2017 | Zhao | |
| 2017/0272901 A1 | 9/2017 | Chen | |
| 2017/0300627 A1 | 10/2017 | Giordano | |
| 2018/0005186 A1 | 1/2018 | Hunn | |
| 2018/0219836 A1 | 8/2018 | Peterson | |
| 2018/0374173 A1 | 12/2018 | Chen | |
| 2019/0057223 A1 | 2/2019 | Hanna | |
| 2019/0080406 A1 | 3/2019 | Molinari | |
| 2019/0109709 A1 | 4/2019 | Wu | |
| 2019/0146979 A1 | 5/2019 | Madisetti | |
| 2019/0236559 A1 | 8/2019 | Padmanabhan | |
| 2019/0236562 A1 | 8/2019 | Padmanabhan | |
| 2019/0236598 A1 | 8/2019 | Padmanabhan | |
| 2019/0236606 A1 | 8/2019 | Padmanabhan et al. | |
| 2019/0238316 A1 | 8/2019 | Padmanabhan | |
| 2019/0238525 A1 | 8/2019 | Padmanabhan | |
| 2019/0244243 A1 | 8/2019 | Goldberg | |
| 2019/0280862 A1 | 9/2019 | Crego | |
| 2019/0303445 A1 | 10/2019 | Padmanabhan | |
| 2019/0318122 A1 | 10/2019 | Hockey | |
| 2019/0333033 A1 | 10/2019 | Finlow-Bates | |
| 2019/0340623 A1 | 11/2019 | Rivkind | |
| 2019/0340689 A1 | 11/2019 | Gordon, III | |
| 2019/0370544 A1 | 12/2019 | Wright, Jr. | |
| 2019/0377806 A1 | 12/2019 | Padmanabhan et al. | |
| 2019/0385236 A1 | 12/2019 | McConnell | |
| 2020/0005284 A1* | 1/2020 | Vijayan | H04L 63/08 |
| 2020/0034457 A1* | 1/2020 | Brody | H04L 9/0819 |
| 2020/0036515 A1 | 1/2020 | Chari | |
| 2020/0042939 A1 | 2/2020 | Padmanabhan | |
| 2020/0074461 A1* | 3/2020 | Derosa-Grund | H04N 21/2543 |
| 2020/0076884 A1 | 3/2020 | Li | |
| 2020/0089663 A1 | 3/2020 | Padmanabhan | |
| 2020/0089670 A1 | 3/2020 | Padmanabhan et al. | |
| 2020/0089671 A1 | 3/2020 | Padmanabhan et al. | |
| 2020/0089672 A1 | 3/2020 | Velisetti et al. | |
| 2020/0092362 A1 | 3/2020 | Balaji | |
| 2020/0112434 A1 | 4/2020 | Goodson | |
| 2020/0133955 A1 | 4/2020 | Padmanabhan et al. | |
| 2020/0134656 A1 | 4/2020 | Padmanabhan | |
| 2020/0137082 A1* | 4/2020 | Jimenez-Delgado | H04L 9/3239 |
| 2020/0159847 A1 | 5/2020 | Smith | |
| 2020/0184558 A1 | 6/2020 | Crumb | |
| 2020/0202038 A1 | 6/2020 | Zhang | |
| 2020/0204375 A1 | 6/2020 | Coulmeau | |
| 2020/0204557 A1 | 6/2020 | Singh | |
| 2020/0213127 A1 | 7/2020 | Maniyar | |
| 2020/0250174 A1 | 8/2020 | Padmanabhan et al. | |
| 2020/0250176 A1 | 8/2020 | Padmanabhan | |
| 2020/0250177 A1 | 8/2020 | Padmanabhan | |
| 2020/0250295 A1 | 8/2020 | Padmanabhan | |
| 2020/0250661 A1 | 8/2020 | Padmanabhan et al. | |
| 2020/0250683 A1 | 8/2020 | Padmanabhan et al. | |
| 2020/0250747 A1 | 8/2020 | Padmanabhan | |
| 2020/0252205 A1 | 8/2020 | Padmanabhan | |
| 2020/0252404 A1 | 8/2020 | Padmanabhan | |
| 2020/0252406 A1 | 8/2020 | Padmanabhan et al. | |
| 2020/0287718 A1 | 9/2020 | Hildebrand et al. | |
| 2020/0287719 A1 | 9/2020 | Hildebrand et al. | |
| 2020/0293500 A1 | 9/2020 | Patil | |
| 2020/0294165 A1 | 9/2020 | Yang | |
| 2020/0328899 A1 | 10/2020 | Glickshtein | |
| 2020/0334752 A1* | 10/2020 | Doney | G06Q 20/3672 |
| 2020/0349142 A1 | 11/2020 | Padmanabhan | |
| 2020/0349564 A1 | 11/2020 | Padmanabhan et al. | |
| 2020/0371995 A1 | 11/2020 | Padmanabhan | |
| 2020/0374105 A1 | 11/2020 | Padmanabhan | |
| 2020/0374106 A1 | 11/2020 | Padmanabhan | |
| 2021/0042746 A1 | 2/2021 | Westland | |
| 2021/0073647 A1* | 3/2021 | Hunter | G06F 9/547 |
| 2021/0117938 A1 | 4/2021 | Arora | |
| 2021/0133700 A1 | 5/2021 | Williams | |
| 2021/0150610 A1 | 5/2021 | Mao | |
| 2021/0150626 A1 | 5/2021 | Robotham | |
| 2021/0152536 A1 | 5/2021 | Padmanabhan | |
| 2021/0182272 A1 | 6/2021 | Shpurov | |
| 2021/0182423 A1 | 6/2021 | Padmanabhan | |
| 2021/0182773 A1 | 6/2021 | Padmanabhan | |
| 2021/0182806 A1 | 6/2021 | Ornelas | |
| 2021/0226774 A1 | 7/2021 | Padmanabhan | |
| 2021/0240498 A1 | 8/2021 | Padmanabhan | |
| 2021/0243193 A1 | 8/2021 | Padmanabhan | |
| 2021/0342329 A1 | 11/2021 | Padmanabhan | |
| 2021/0357893 A1 | 11/2021 | Kang | |
| 2021/0373878 A1 | 12/2021 | Padmanabhan | |
| 2021/0374759 A1 | 12/2021 | Padmanabhan | |
| 2021/0377028 A1 | 12/2021 | Doney | |
| 2021/0382966 A1 | 12/2021 | Shii | |
| 2021/0385087 A1 | 12/2021 | Hildebrand | |
| 2021/0397604 A1 | 12/2021 | Padmanabhan | |
| 2022/0006705 A1 | 1/2022 | Padmanabhan | |
| 2022/0027356 A1 | 1/2022 | Padmanabhan | |
| 2022/0058633 A1 | 2/2022 | Yantis | |
| 2022/0101316 A1 | 3/2022 | Cramer | |
| 2022/0114238 A1 | 4/2022 | Padmanabhan | |
| 2022/0129475 A1 | 4/2022 | Thaw | |
| 2022/0147988 A1* | 5/2022 | Alexa | G06Q 20/3827 |
| 2022/0173893 A1 | 6/2022 | Basu | |
| 2022/0210061 A1 | 6/2022 | Simu | |
| 2022/0245560 A1 | 8/2022 | Dhaliwal | |
| 2022/0248165 A1 | 8/2022 | Dhaliwal | |
| 2022/0253836 A1 | 8/2022 | Russell | |
| 2022/0271915 A1* | 8/2022 | Turner | H04L 9/3247 |
| 2022/0276996 A1 | 9/2022 | Gaur | |
| 2022/0284008 A1* | 9/2022 | Treitlinger | G06F 16/2379 |
| 2022/0300487 A1 | 9/2022 | Wright | |
| 2022/0300966 A1* | 9/2022 | Andon | G06Q 30/0277 |
| 2022/0303141 A1 | 9/2022 | Branton | |
| 2022/0311611 A1 | 9/2022 | Gaur | |
| 2022/0351186 A1 | 11/2022 | Quigley | |
| 2022/0358450 A1 | 11/2022 | Stephens | |
| 2022/0358462 A1 | 11/2022 | Oldfield | |
| 2022/0358580 A1* | 11/2022 | Sliwka | G06Q 20/3678 |

(56) References Cited

U.S. PATENT DOCUMENTS

| | | | |
|---|---|---|---|
| 2022/0391895 A1* | 12/2022 | Weber | G06Q 20/3823 |
| 2022/0398538 A1 | 12/2022 | Jakobsson | |
| 2022/0414621 A1* | 12/2022 | Parlotto | G06F 21/64 |
| 2022/0414809 A1 | 12/2022 | Geng | |
| 2023/0081152 A1 | 3/2023 | Blazevige | |
| 2023/0126016 A1 | 4/2023 | Nelson | |
| 2023/0143854 A1* | 5/2023 | Venezia | H04L 9/3297 |
| | | | 705/65 |
| 2023/0206329 A1* | 6/2023 | Cella | G06F 16/906 |
| 2023/0230054 A1* | 7/2023 | Livesay | G06Q 20/3674 |
| | | | 705/39 |
| 2023/0274244 A1 | 8/2023 | Quigley | |
| 2023/0274270 A1 | 8/2023 | Marty | |
| 2023/0291544 A1* | 9/2023 | Turner | H04L 9/0618 |
| 2023/0298010 A1 | 9/2023 | Junsup | |
| 2024/0005038 A1 | 1/2024 | Yuan | |

FOREIGN PATENT DOCUMENTS

| | | |
|---|---|---|
| AU | 2019345041 A1 | 4/2021 |
| AU | 2020351764 A1 | 4/2022 |
| CN | 111902810 A | 11/2020 |
| CN | 111919417 A | 11/2020 |
| CN | 113039568 A | 6/2021 |
| CN | 113056760 A | 6/2021 |
| EP | 3747153 A1 | 12/2020 |
| EP | 3776255 A1 | 2/2021 |
| EP | 3853794 A1 | 7/2021 |
| JP | 2021512416 A | 5/2021 |
| WO | 2018109010 | 6/2018 |
| WO | 2019152750 A1 | 8/2019 |
| WO | 2019190855 A1 | 10/2019 |
| WO | 2019241071 A1 | 12/2019 |
| WO | 2020061224 A1 | 3/2020 |
| WO | 2020061225 A1 | 3/2020 |
| WO | 2020061226 A1 | 3/2020 |
| WO | 2020092900 A2 | 5/2020 |
| WO | 2020160109 A1 | 8/2020 |
| WO | 2020234814 A1 | 11/2020 |
| WO | 2021116950 A1 | 6/2021 |
| WO | 2021250045 A1 | 12/2021 |

OTHER PUBLICATIONS

Padmanabhan, Prithvi Krishnan, "Database System Public Trust Ledger Architecture", U.S. Appl. No. 17/410,366, filed Aug. 24, 2021.

Padmanabhan, Prithvi Krishnan, "Database System Public Trust Ledger Architecture", U.S. Appl. No. 17/410,376, filed Aug. 24, 2021.

Padmanabhan, Prithvi Krishnan, "Database System Public Trust Ledger Multi-Owner Token Architecture", U.S. Appl. No. 17/517,543, filed Nov. 2, 2021.

Padmanabhan, Prithvi Krishnan, "Database System Public Trust Ledger Token Creation and Exchange", U.S. Appl. No. 17/517,522, filed Nov. 2, 2021.

Padmanabhan, Prithvi Krishnan, "Database System Public Trust Token Redeem Architecture Using Wallets", U.S. Appl. No. 17/517,541, filed Nov. 2, 2021.

U.S. Appl. No. 16/294,646, Corrected Notice of Allowance mailed Jun. 30, 2021, 11 pgs.

U.S. Appl. No. 16/294,646, Examiner Interview Summary mailed Mar. 29, 2021, 3 pgs.

U.S. Appl. No. 16/294,646, Examiner Interview Summary mailed May 28, 2021, 2 pgs.

U.S. Appl. No. 16/294,646, Examiner Interview Summary mailed Jun. 30, 2021, 1 pg.

U.S. Appl. No. 16/294,646, Non-Final Office Action mailed Feb. 22, 2021, 23 pgs.

U.S. Appl. No. 16/294,646, Notice of Allowance mailed May 28, 2021, 13 pgs.

U.S. Appl. No. 16/294,654, Corrected Notice of Allowance mailed Jun. 30, 2021, 10 pgs.

U.S. Appl. No. 16/294,654, Examiner Interview Summary mailed Mar. 29, 2021, 2 pgs.

U.S. Appl. No. 16/294,654, Examiner Interview Summary mailed Jun. 1, 2021, 1 pg.

U.S. Appl. No. 16/294,654, Examiner Interview Summary mailed Jun. 30, 2021, 1 pg.

U.S. Appl. No. 16/294,654, Non-Final Office Action mailed Feb. 22, 2021, 26 pgs.

U.S. Appl. No. 16/294,654, Notice of Allowance mailed Jun. 1, 2021, 13 pgs.

Notice of Allowance dated May 11, 2023 for U.S. Appl. No. 17/648,865 (pp. 1-12).

Office Action (Final Rejection) dated Jun. 21, 2023 for U.S. Appl. No. 17/410,376 (pp. 1-30).

Office Action (Final Rejection) dated Jun. 22, 2023 for U.S. Appl. No. 17/410,366 (pp. 1-32).

Office Action (Final Rejection) dated Sep. 20, 2023 for U.S. Appl. No. 17/517,541 (pp. 1-23).

Office Action (Non-Final Rejection) dated Mar. 2, 2023 for U.S. Appl. No. 17/410,376 (pp. 1-26).

Office Action (Non-Final Rejection) dated May 24, 2023 for U.S. Appl. No. 17/517,522 (pp. 1-13).

Office Action (Non-Final Rejection) dated May 31, 2023 for U.S. Appl. No. 17/412,059 (pp. 1-13).

Office Action (Non-Final Rejection) dated Jul. 26, 2023 for U.S. Appl. No. 17/517,543 (pp. 1-23).

Office Action (Non-Final Rejection) dated Sep. 14, 2023 for U.S. Appl. No. 17/410,376 (pp. 1-29).

Office Action (Notice of Allowance and Fees Due (PTOL-85)) dated Jul. 27, 2023 for U.S. Appl. No. 17/412,059 (pp. 1-8).

Office Action dated Mar. 6, 2023 for U.S. Appl. No. 17/517,541 (pp. 1-28).

Office Action dated Sep. 20, 2023 for U.S. Appl. No. 17/517,541 (pp. 1-24).

Padmanabhan, Prithvi Krishnan, "Database System Public Trust Ledger Contract Linkage", U.S. Appl. No. 17/412,056, filed Aug. 25, 2021, 81 pages.

Notice of Allowance dated Oct. 20, 2023 for U.S. Appl. No. 17/662,812 (pp. 1-8).

Office Action (Final Rejection) dated Nov. 20, 2023 for U.S. Appl. No. 17/517,522 (pp. 1-15).

Office Action (Non-Final Rejection) dated Feb. 8, 2024 for U.S. Appl. No. 17/662,795 (pp. 1-18).

Office Action (Non-Final Rejection) dated Oct. 19, 2023 for U.S. Appl. No. 17/410,366 (pp. 1-23).

Office Action (Non-Final Rejection) dated Oct. 26, 2023 for U.S. Appl. No. 17/933,827 (pp. 1-15).

Office Action (Non-Final Rejection) dated Dec. 14, 2023 for U.S. Appl. No. 17/662,810 (pp. 1-15).

Office Action (Notice of Allowance and Fees Due (PTOL-85)) dated Jan. 24, 2024 for U.S. Appl. No. 17/410,376 (pp. 1-9).

Office Action (Notice of Allowance and Fees Due (PTOL-85)) dated Jan. 29, 2024 for U.S. Appl. No. 17/517,543 (pp. 1-14).

Office Action (Notice of Allowance and Fees Due (PTOL-85)) dated Dec. 20, 2023 for U.S. Appl. No. 17/648,862 (pp. 1-14).

Torres et al. A Survey on Identity Management for the Future Network, IEEE, Aug. 20, 2012, pp. 1-16. (Year: 2012).

Zhikui Chen, A Scenario for Identity Management in Daidalos, IEEE, May 1, 2012, pp. 1-8. (Year: 2007).

* cited by examiner

Smart contract 500

Public Key 502

Private key 504

Transaction Interface 506

Owner ID 508

Smart Contract ID List 510

Smart Contract Metadata 520

Item Token 512

Token ID 514 | Digital Asset ID 516 | Token Type 518

Figure 5

DATABASE SYSTEM PUBLIC TRUST LEDGER CONTRACT LINKAGE

CROSS-REFERENCE TO RELATED APPLICATIONS

This application claims priority to U.S. Patent App. No. 63/230,293 by Prithvi Krishnan Padmanabhan, filed Aug. 6, 2021, titled "DATABASE SYSTEM PUBLIC TRUST LEDGER ARCHITECTURE", which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

FIELD OF TECHNOLOGY

This patent document relates generally to database systems and more specifically to interactions between database systems and public trust ledgers.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Another mechanism for storing information is a public trust ledger, such as a blockchain. A public trust ledger is a distributed repository in which transactions are recorded. Transactions can be monetary, such as recording a payment, or non-monetary, such as recording a transfer of ownership. A public trust ledger is a distributed repository that is publicly accessible and that is secured based on cryptographic protocols.

Cloud computing systems provide platforms for a variety of computing operations. However, a cloud computing environment is typically controlled by a service provider that supervises and governs the environment. A public trust ledger does not depend on a trusted party to manage it, but does not provide a platform for many of the types of operations performed within a cloud computing system. Accordingly, improved techniques for transaction management are desired.

BRIEF DESCRIPTION OF THE DRAWINGS

The included drawings are for illustrative purposes and serve only to provide examples of possible structures and operations for the disclosed inventive systems, apparatus, methods and computer program products for database system digital asset creation and transfer. These drawings in no way limit any changes in form and detail that may be made by one skilled in the art without departing from the spirit and scope of the disclosed implementations.

FIG. 5 illustrates an example of a smart contract, configured in accordance with one or more embodiments.

DETAILED DESCRIPTION

Figure 1:
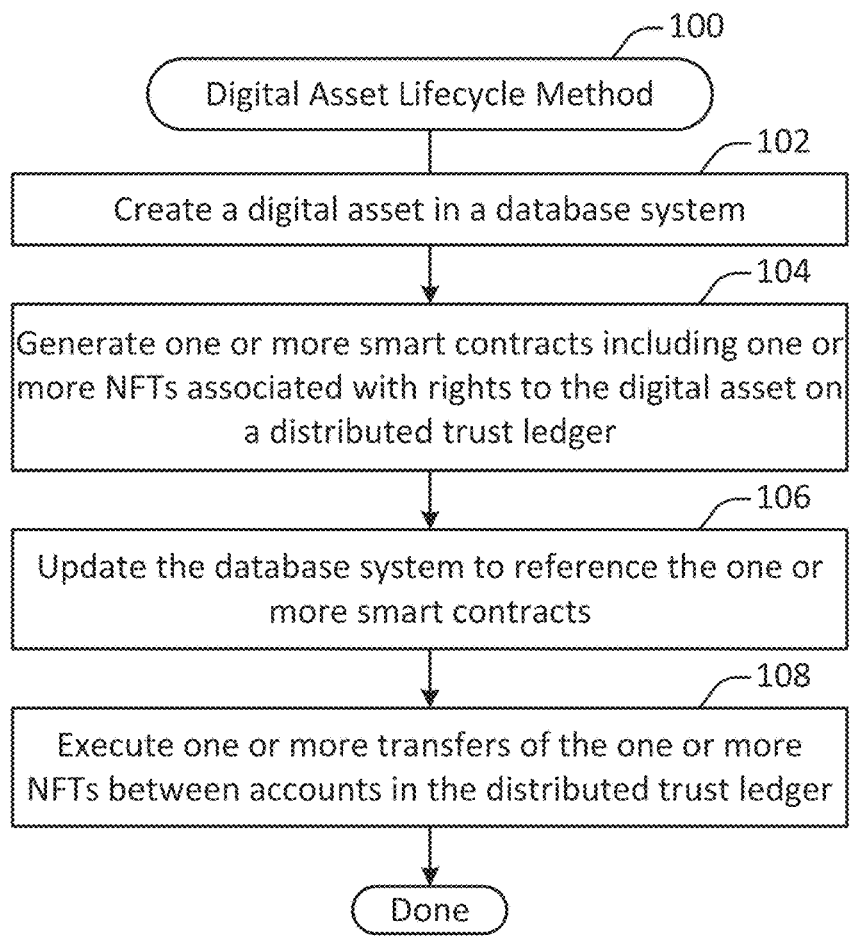
FIG. 1 illustrates an example of a digital asset lifecycle method, performed in accordance with one or more embodiments.

Techniques and mechanisms described herein relate to interactions between an on-demand database system and a public trust ledger such as a blockchain. A digital asset referenced within the on-demand database system may be created and owned by an entity within the on-demand database system. The ownership relationship may then be recorded in the public trust ledger. If and when the ownership of the digital asset changes, for instance due to a purchase, the transaction may also be recorded in the public trust ledger. Moreover, the public trust ledger may be used to record transactions transferring types of rights other than ownership, such as transfers of copyrights, usage rights, control rights, modification rights, and the like.

An on-demand database system allows entities to store information such as records of transactions. However, in conventional systems, an on-demand database system is typically controlled by a service provider, requiring parties to a transaction recorded in the on-demand database system to trust that the service provider will continue to exist, will maintain an adequate level of security, will not permit the transaction record to be lost or corrupted, and will generally behave in a trustworthy manner.

Techniques and mechanisms described herein provide for interactions between an on-demand database system and a public trust ledger. A public trust ledger provides a way to record transactions in a manner that is secure, publicly verifiable, and free from control of any one entity. For instance, the database system may interact with the public trust ledger to record transactions related to the creation and transfer of ownership and other rights in digital assets referenced within the on-demand database system. The public trust ledger may then serve as a source of truth that it is independent of the service provider. A trust ledger may be variously referred to herein as a public trust ledger or a distributed trust ledger.

Consider the example of Alexandra, an asset manager for an apparel company "Acme" accessing computing services via the on-demand database system. Alexandra would like to create digital versions of the company's apparel products for use in digital environments, such as in conjunction with virtual avatars. Although non-fungible tokens (NFTs) have been used for the creation of digital assets, such tokens typically need to be created individually when using conventional systems and techniques. Further, when using conventional systems and techniques, such assets are not connected to Acme's customer relations management (CRM) systems, inventory management systems, and other such systems within the on-demand database system. Further, under a conventional approach, the copyright and other rights on those digital assets remains with Acme, which has no convenient way to manage and transfer individual rights associated with many digital assets.

In contrast, using techniques and mechanisms described herein, Alexandra may automatically create many different digital assets from within the on-demand database system. For example, Alexandra may use a template to create many different digital versions of a shoe, each having a unique color combination. Then, a non-fungible token recorded in a smart contract within a public trust ledger may be automatically created for each of the digital assets. The public trust ledger may be used to record ownership transfers of the digital assets in a way that is secure, publicly verifiable, and outside the control of the on-demand database system service provider. Alexandra is also provided with the option to allow for the transfer rights other than ownership, such as copyrights or modification rights.

According to various embodiments, techniques and mechanisms described herein may facilitate the creation of non-fungible tokens. For instance, an entity accessing services via the on-demand computing services environment can easily and dynamically create any number of non-fungible tokens corresponding with digital assets such as avatars, apparel, characters, promotional material, or any other digital item.

According to various embodiments, techniques and mechanisms described herein provide support for enterprise-level cryptocurrency. For example, an enterprise service provider that provides an on-demand computing services environment may support an enterprise-level cryptocurrency that may be used across the on-demand computing services environment. Entities accessing computing services via the on-demand computing services environment may employ the cryptocurrency to make transactions with the service provider, with each other, and with entities outside of the service environment. As another example, an entity accessing the on-demand computing services environment may create an entity-specific cryptocurrency, such as a branded token, loyalty point token, or other type of fungible token. That entity may then employ the fungible token to provide incentives, support payments within an ecosystem, or facilitate other types of transactions.

In particular embodiments, the service provider may create a particular amount of an enterprise-level cryptocurrency associated with the on-demand computing services environment, such as 10 billion tokens. That enterprise-level cryptocurrency may then be issued to or distributed among consumers, which may include, but are not limited to, business organizations and individual users accessing computing services via the on-demand computing services. For example, the enterprise-level cryptocurrency may be used to provide incentives for behavior. In some configurations, a business organization may extend or rebrand the enterprise-level cryptocurrency to create an organizations-specific cryptocurrency that nevertheless interoperates with the enterprise-level cryptocurrency.

In particular embodiments, business organizations may create their own cryptocurrency or other fungible or non-fungible tokens within the on-demand computing services environment. For instance, such tokens may be branded with a brand associated with a particular business organization. Such tokens may then be used for any suitable purpose, such as being awarded to consumers for use in loyalty, reward programs, and/or retail transactions associated with the brand or business organization.

In particular embodiments, cryptocurrency or other fungible or non-fungible tokens may be used across brands and/or organizations. Such usage may facilitate consumer engagement and/or collecting valuable information about consumers. However, because the tokens are associated with the on-demand computing services environment, CRM analytics pertaining to the tokens within the on-demand computing service environment may provide a single source of truth for gathering, analyzing, and interpreting trends in consumer behavior.

According to various embodiments, techniques and mechanisms described herein may provide technical solutions that facilitate a variety of new ways for organizations to interact with customers. For example, an organization may employ branded collectibles represented by digital assets, facilitating expanded community engagement. As another example, an organization may bundle real world and digital experience linked to digital assets. As yet another example, an organization may securely send exclusive codes for benefits such as early access, discounts, VIP tickets, and gift cards. As still another example, an organization may build a loyal base of customers with free or gamified rewards across different use cases.

According to various embodiments, techniques and mechanisms described herein may facilitate the integration of blockchain data with database system data such as customer relations management (CRM) data and analytics. For instance, information stored in a database system, such as CRM data, may be linked with publicly verified information stored in a block chain to provide a combination of control, security, and verifiability. Such linkages may help to support, for instance, partnerships between organizations such as cross-brand partnerships and promotions.

According to various embodiments, techniques and mechanisms described herein may provide for control over transaction costs. For example, high transfer fees for low value assets may hinder the development of a digital marketplace. To avoid such problems, a service provider or other enterprise associated with a digital asset may set a fixed fee for transferring the digital asset. Such fees may be set, for instance, based on the asset type being transferred.

According to various embodiments, techniques and mechanisms described herein may provide for privacy and data rights. For instance, an organization may integrate customer relations management, such as records of transactions with and between customers, into the database system. Information such as transaction records may be publicly verifiable via recordation in the public trust ledger. However, privacy may be maintained be keeping private information, such as personally identifying information, securely stored within the database system.

According to various embodiments, techniques and mechanisms described herein may provide for scalability. Conventional techniques for interacting with public trust ledgers do not support enterprise-level exchange of digital assets. However, techniques and mechanisms described herein provide technological solutions for scaling digital asset exchange to the enterprise level, ensuring that transactions can occur quickly and efficiently even at high transaction throughput levels.

According to various embodiments, techniques and mechanisms described herein provide for smart contracts. In addition to supporting simple tokens, various embodiments can support modeling complex asset classes. For example, smart contracts may include rules governing transactional aspects such as the number of transactions, type of transactions, and identities of parties.

According to various embodiments, techniques and mechanisms described herein provide technological solutions for facilitating interactions between database systems and public trust ledgers such as blockchain. For example, based on these techniques and mechanisms a blockchain may be used to store verification information, while other types of data may be stored in the database system. Such configurations can provide enhanced speed, reduced transaction costs, and improved data security as compared with conventional techniques. For instance, transactions may be publicly verified while at the same time storing data in a way that is consistent with privacy regulations.

Figure 17:
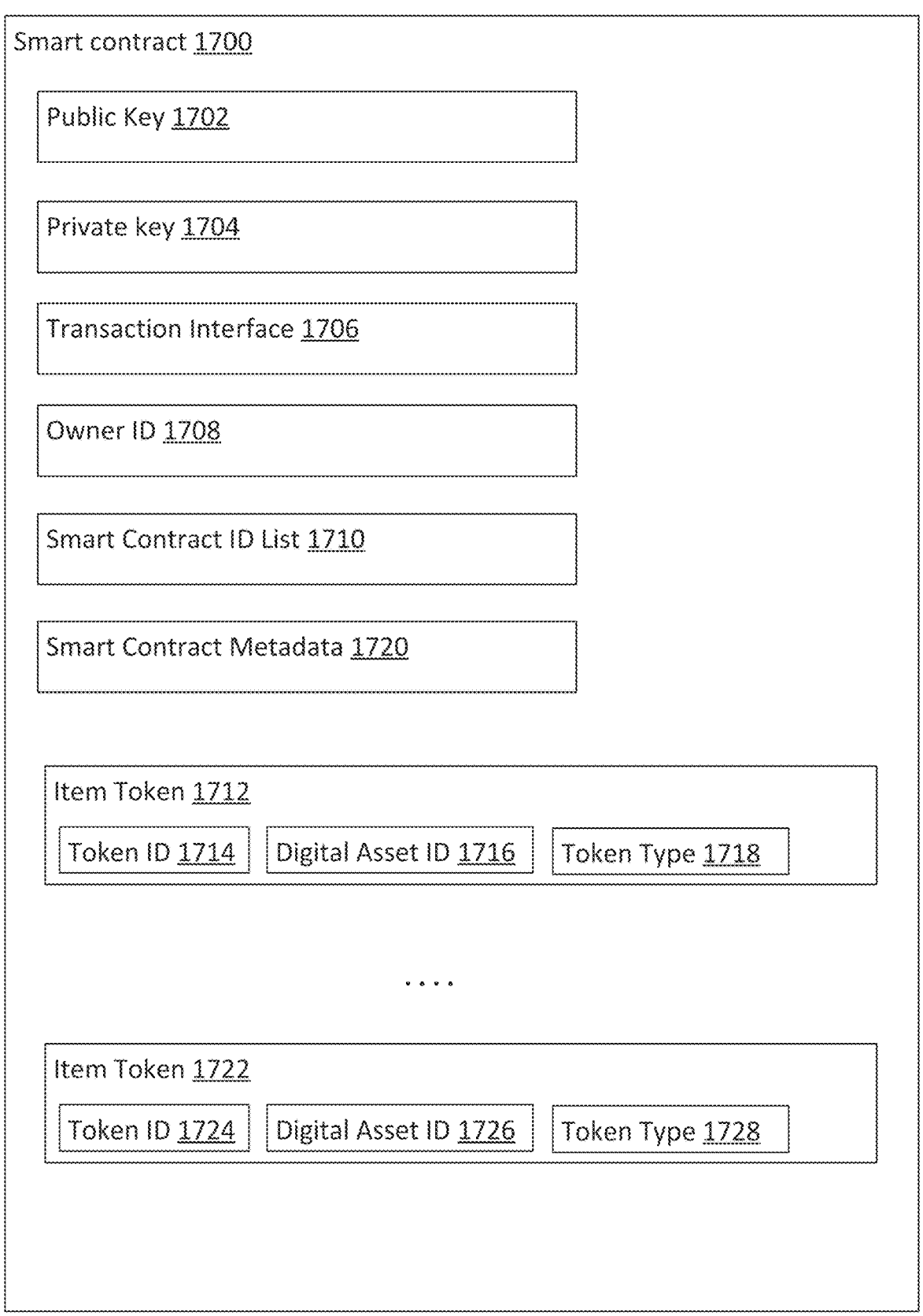
FIG. 17 illustrates an example of a smart contract, configured in accordance with one or more embodiments.
Figure 18:
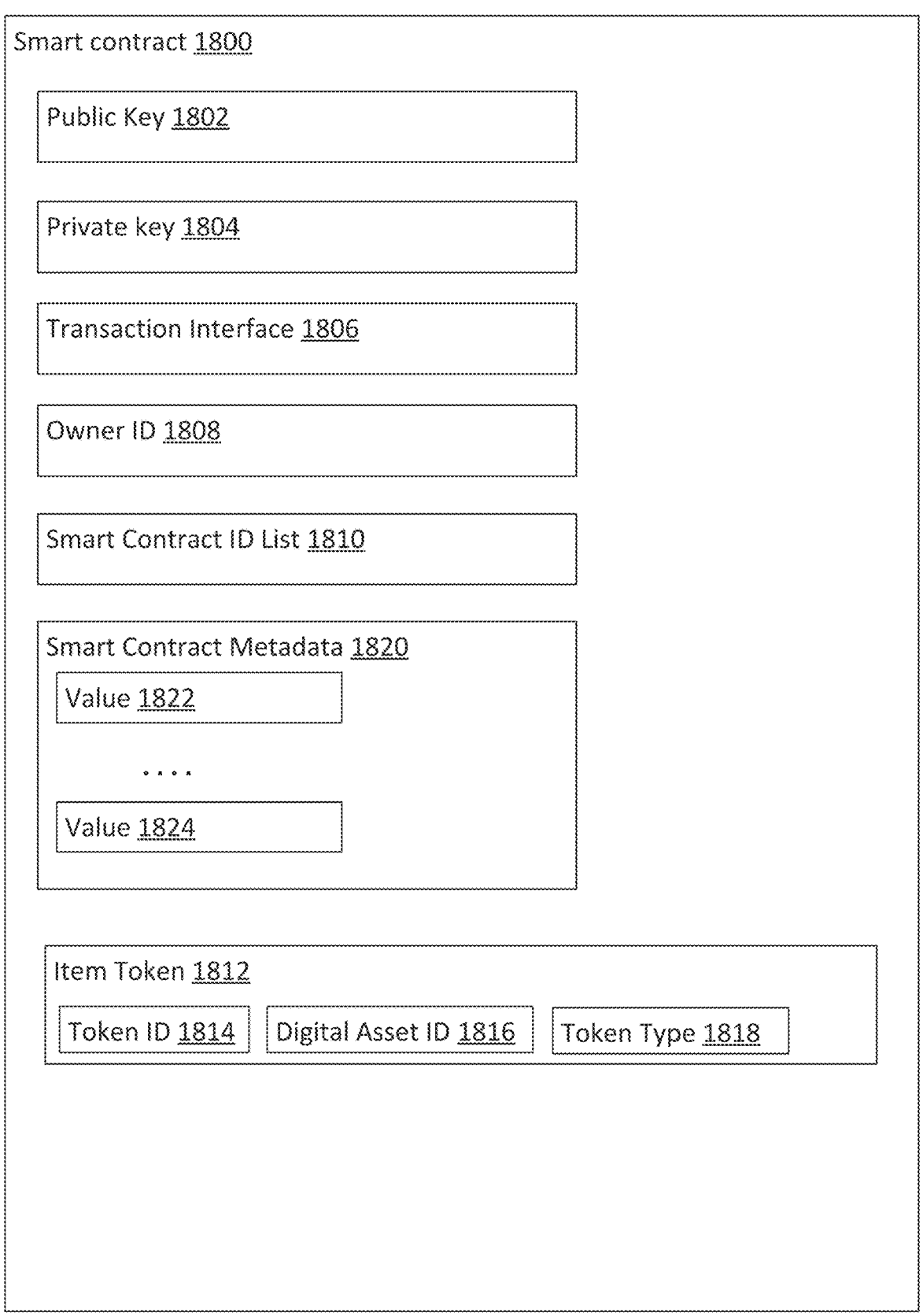
FIG. 18 illustrates an example of a smart contract, configured in accordance with one or more embodiments.
Figure 19:
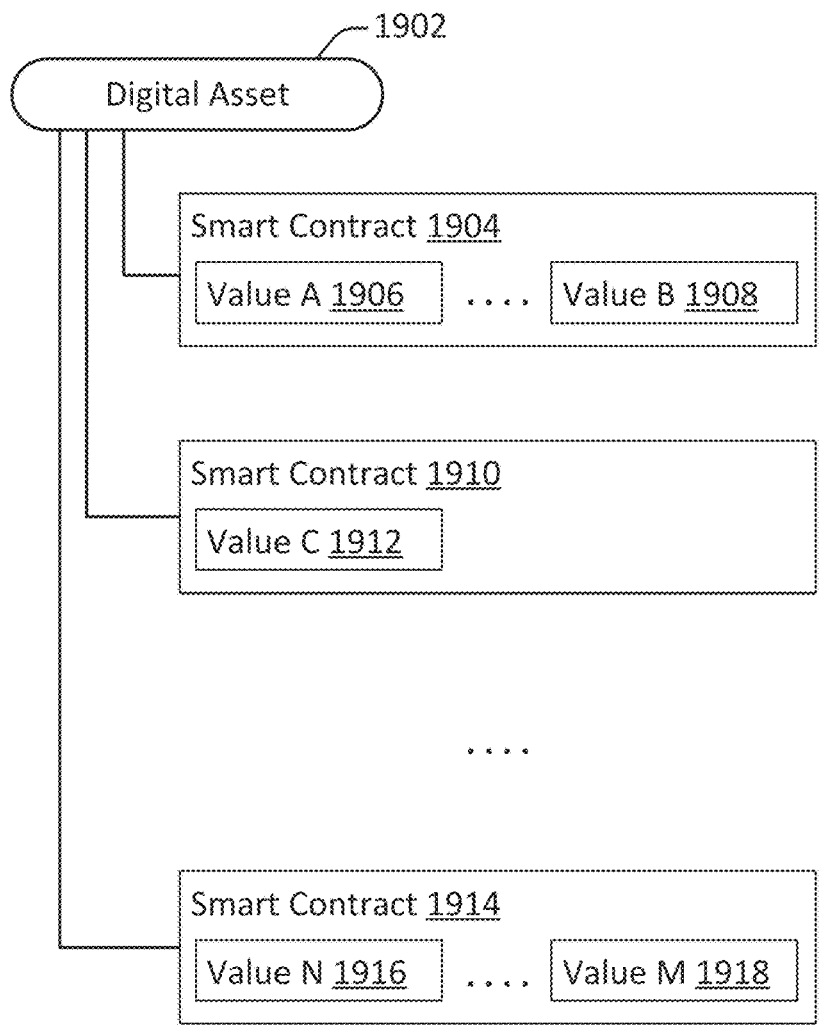
FIG. 19 illustrates a system in which a digital asset is associated with a number of different smart contracts, configured in accordance with one or more embodiments.
Figure 20:
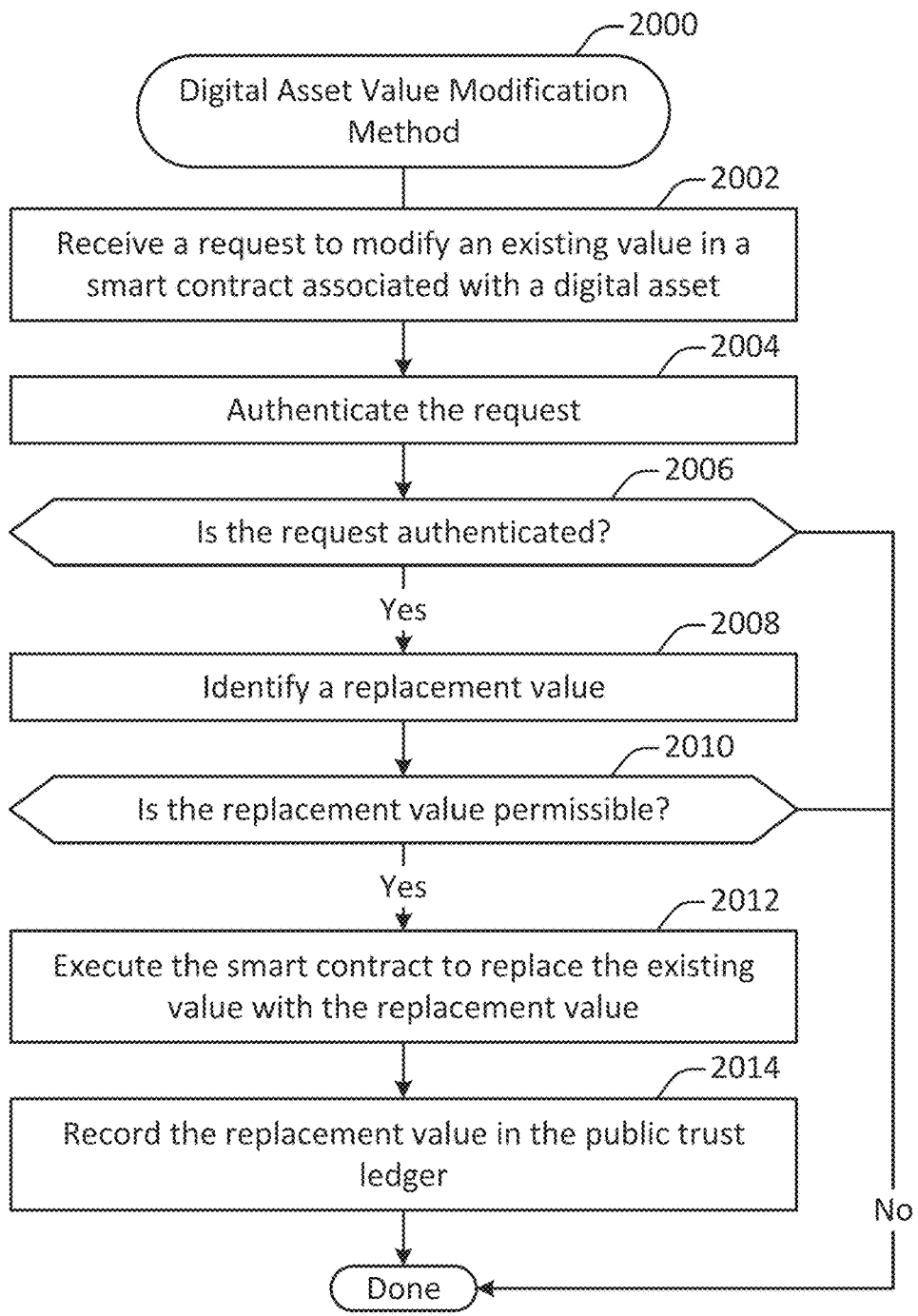
FIG. 20 illustrates a digital asset value modification method, performed in accordance with one or more embodiments.

According to various embodiments, some techniques and mechanisms described herein relate to linkages between tokens and/or smart contracts. For example, as shown in FIG. 17, a single smart contract may include more than one token, including tokens of different types. As another example, as shown in FIG. 18, smart contracts may be linked together in a traversable chain. As yet another example, as shown in FIG. 19, a smart contract may include one or more modifiable values, which may be stored in the public trust ledger once modified. FIG. 20 describes a method for modifying such values, and FIG. 21 describes ways in which such values may be accessed.

According to various embodiments, techniques and mechanisms described herein may provide for digital assets whose state depends on modifiable values in smart contracts associated with those digital assets. For example, an appearance of a virtual avatar may change based on modifiable values stored within one or more smart contracts that are associated with the virtual avatar.

According to various embodiments, techniques and mechanisms described herein may provide for enhanced transaction fee management techniques. When using conventional techniques, transaction fees may fluctuate based on the state of the public trust ledger. However, in some implementations described herein, a party may pay a fixed transaction fee to the database system. The fee may be determined based on, for instance, an asset type, a party type, or other such information. The database system may then communicate with the public trust ledger to record the transaction.

As used herein, the terms "database" and "public trust ledger" are distinct. For example, a database system is controlled by a particular database administrator or service provider, whereas a public trust ledger is a peer-to-peer system in which transactions are publicly recorded in a manner that is outside the control of any one particular organization.

FIG. 1 illustrates an example of a digital asset lifecycle method 100, performed in accordance with one or more embodiments. According to various embodiments, the digital asset lifecycle method 100 may be performed on one or more computing devices within an on-demand computing services environment.

A digital asset is created in a database system at 102. According to various embodiments, the digital asset 102 may be any of a wide variety of assets. For instance, the digital asset 102 may be a digital wardrobe item for a digital avatar, a piece of digital artwork, a piece of music, a film, a digital photograph, an item of digital memorabilia, an animation, or any other type of item. In particular configurations, a digital asset 102 may correspond with a physical asset. For instance, a digital asset may be associated with a unique identifier, which is in turn uniquely associated with one or more items in the physical world.

One or more smart contracts including one or more NFTs associated rights to the digital asset are generated on a public trust ledger at 104. The database may be updated at 106 to reference the one or more smart contracts. According to various embodiments, a smart contract may be generated by minting an NFT of a designated token type in the public trust ledger. An NFT and associated smart contract may be used to record and/or transfer any or all of various types of rights. Such rights may include, but are not limited to: ownership of a digital asset, copyright to a digital asset, and a right to modify a digital asset.

One or more transfers of the one or more NFTs between accounts in the public trust ledger are executed at 108. According to various embodiments, the one or more transfers may be recorded by executing the one or more smart contracts created at 104. The transfers may be executed in order to transfer ownership of the digital asset and/or one or more rights related to the digital asset between parties. The database system may then be updated to reflect the executed transfers. An account in the digital trust ledger may be linked with an account in the database system.

Figure 2:
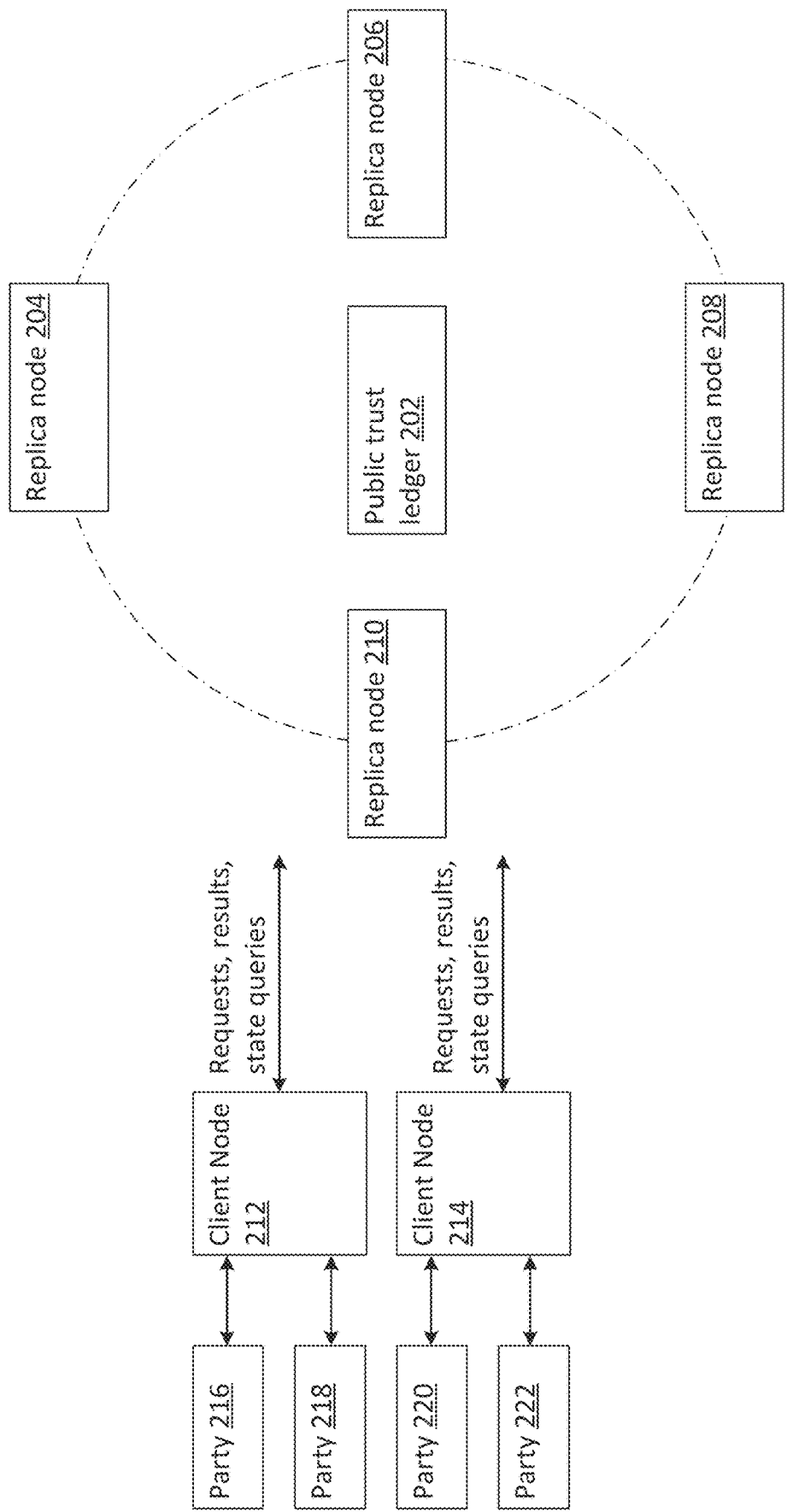
FIG. 2 illustrates an ecosystem facilitating interactions between a database system and a public trust ledger, configured in accordance with one or more embodiments.

FIG. 2 illustrates an ecosystem 200 facilitating interactions between a database system and a public trust ledger, configured in accordance with one or more embodiments. The ecosystem 200 may be used to implement techniques described herein, and may be implemented using one or more devices and systems shown in FIG. 13, FIG. 14A, FIG. 14B, and FIG. 15.

The ecosystem 200 includes a public trust ledger 202. According to various embodiments, the public trust ledger 202 may store information related to digital assets and transactions pertaining to digital assets. The public trust ledger 202 may be cryptographically verifiable. For example, the public trust ledger may employ one or more cryptographic technologies to provide a transparent, immutable, and cryptographically-verifiable log of transactions stored in the database.

In some implementations, the public trust ledger 202 may be configured so as to provide a single, consistent state at any time, allowing requests to continue to be processed despite failures or attacks. Requests to update the global state of the public trust ledger 202 may be implemented in a consistent manner. Such requests may be globally ordered via consensus between nodes.

Replica nodes are shown at 204, 206, 208, and 10. According to various embodiments, each replica node may be implemented via VMware. However, other types of node management tools may be used instead of, or in addition to, VMware. A replica node may process requests to verify or change the state of the public trust ledger 202.

According to various embodiments, the replica nodes may provide Byzantine fault tolerance (BFT). In a Byzantine fault, a component such as a server can inconsistently appear both failed and functioning to failure-detection systems, presenting different symptoms to different observers. It is difficult for the other components to declare it failed and shut it out of the network, because they need to first reach a consensus regarding which component has failed in the first place. However, the ecosystem 200 may use techniques such as the BFT State Machine Replication protocol and Merkle Tree data structures to ensure that the Replica and Client nodes' data are identical and to therefore provide tolerance against such faults.

According to various embodiments, interactions with the replica nodes may be conducted via client nodes, such as the client nodes 212 and 214. Each of the client and replica nodes may implement an application procedure interface (API) such as a Digital Asset Modeling Language ("DAML") ledger API server. According to various embodiments, DAML is an open-source smart contract language that aids in modeling agreements and runs on blockchain platforms. DAML Ledgers enable multi-party workflows by providing parties with a virtual shared ledger, which encodes the current state of their shared contracts, written in DAML.

In some implementations, a client node may communicate with one or more parties 216, 218, 220, 222 via a network such as the internet. According to various embodiments, a party may be a computing device on which an account in the public trust ledger has been authenticated, communicating via a secured session. For example, a party may submit a request to a client node, in accordance with methods described herein. The client node may send requests to one or more of the replica nodes and receive the results of running the requests. A client node may include a privacy-filtered subset of the state of the public trust ledger.

Figure 3:
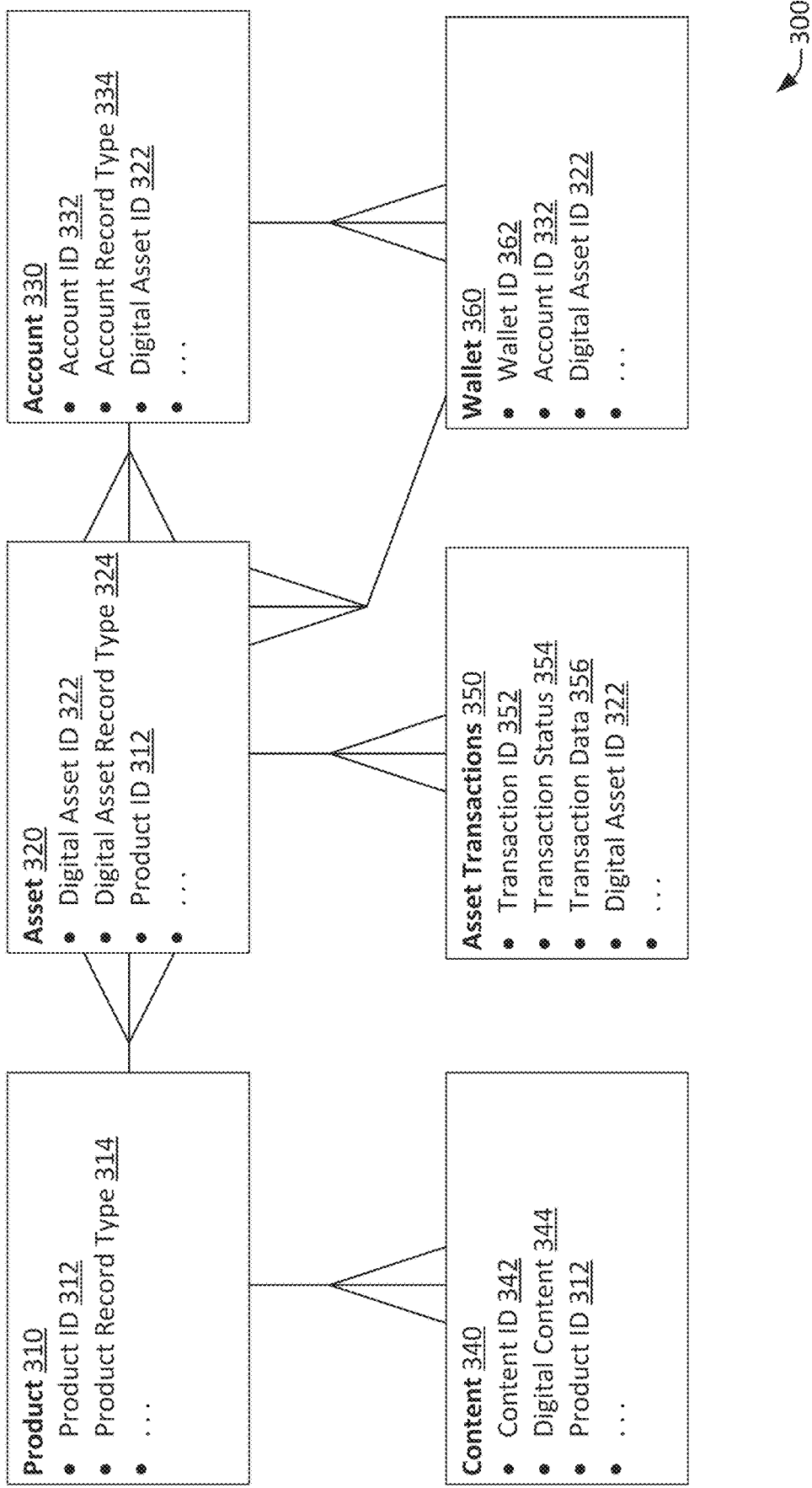
FIG. 3 illustrates an example of an arrangement of elements in a database system, configured in accordance with one or more embodiments.

FIG. 3 illustrates an example of an arrangement of elements in a database system 300, configured in accordance with one or more embodiments. The database system 300 includes the product table 310, the asset table 320, the account table 330, the content table 340, the asset transactions table 350, and the wallet table 360.

According to various embodiments, the product table 310 includes entries that identify the products to which the digital assets relate. An entry in the product table 310 may include a product ID 312 that uniquely identifies the product. An entry may also include a product record type 314. A product record type may be, for example, an NFT, a branded token, a cryptocurrency, or any other suitable product type.

According to various embodiments, the content table 340 includes additional content information associated with a product. An entry in the content table may include a content ID 342 that identifies the content. Alternatively, or additionally, an entry in the content table may include a product ID 312 identifying a product to which the content relates. In particular embodiments, a single product represented by an entry in the product table 310 may be associated with more than one entry in the content table 340.

In some implementations, the entry may also include digital content 344. The digital content may include, for example, media data associated with a product. Such media data may include, but is not limited to: one or more videos, animations, images, documents, or audio segments. In some configurations, the digital content data may be stored within the content table 340. Alternatively, or additionally, digital content data may be stored in a different location and a reference to that location or data stored within the content table 340.

According to various embodiments, the asset table 320 may store information about digital assets associated with tokens. For example, a digital asset may be a fungible token such as cryptocurrency or rewards program points. As another example, a digital asset may be ownership of, copyright to, or some other right related to an NFT. Various types of digital assets are possible, and a single product may be associated with more than one digital asset.

According to various embodiments, an entry in the asset table 320 may include a digital asset ID 322 that uniquely identifies the digital asset. An entry may also include a digital asset record type 324 that identifies the type of digital asset. For instance, the digital asset record type 324 may be an NFT, branded token, cryptocurrency, or any other suitable digital asset type.

According to various embodiments, the asset transactions table 350 may store information related to transactions involving the assets identified in the asset table 320. Accordingly, an entry in the asset transaction table 350 may include a transaction ID 352 that uniquely identifies the transaction and a digital asset ID 322 to which the transaction pertains. A single digital asset ID 322 may be associated with more than one transaction.

In some implementations, an entry in the asset transaction table 350 may include a transaction status field 354. The transaction status field 354 may store information such as whether the transaction is pending, canceled, or complete.

In some implementations, an entry in the asset transaction table 350 may include transaction data 356. The transaction data 356 may include any information related to the transaction. For example, the transaction data 356 may include or reference a contractual agreement that provides legal support for a transfer of rights represented by the transaction.

According to various embodiments, the account table 330 may store information that links database system accounts with digital assets. An entry in the account table 330 may include an account ID 332 that uniquely identifies an account within the database system. The account ID 332 may correspond to an individual, an organization, or any other suitable entity type. In particular implementations, the database system 300 may be configured at least in part as a multitenant database. In such a configuration, the account ID 332 may identify a tenant within the multitenant database.

In some implementations, an entry in the account table 330 may include a digital asset ID 332 that uniquely identifies a digital asset. A single account ID 332 may be associated with more than one digital asset IDs 332.

In some implementations, an entry in the account table 330 may include an account record type 334. The account record type 334 may indicate, for instance, whether the account ID 332 included in the account record is a buyer or an issuer of the digital asset ID 332.

According to various embodiments, the wallet table 360 links database system accounts and digital assets with wallets in one or more public trust ledgers. For example, an entry in the wallet table 360 may include a wallet ID 362 that uniquely identifies a wallet in a public trust ledger. As another example, an entry in the wallet table 360 may include a digital asset ID 322 identifying a digital asset stored as a token in the wallet identified by the wallet ID 362. As yet another example, an entry in the wallet table 360 may include an account ID 332 the identifies an account in the database system associated with the wallet. A single database system account may be associated with more than one wallet.

In some implementations, the wallet table 360 may include a public trust ledger ID, for instance in a configuration in which the database system 300 interacts with more than one public trust ledger.

The configuration of tables shown in FIG. 3 is only one example of a database system configuration that may be used in conjunction with techniques and mechanisms described herein. According to various embodiments, any of a variety of database system configurations may be used. For example, two or more of the tables shown in FIG. 3 may instead be implemented in a single table. As another example, information shown in FIG. 3 as being stored in a single table may instead be stored in more than one table. As yet another example, tables shown in FIG. 3 may include other information not represented in FIG. 3.

In some implementations, the database system 300 may be implemented as a multitenant database. In such a configuration, a database account ID 332 may uniquely identify a tenant within the multitenant database. Alternatively, a different type of database architecture may be employed.

According to various embodiments, the database system 300 may include many components other than those shown in FIG. 3. Examples of the types of components that may be included in a database system are discussed with respect to FIG. 13, FIG. 14A, and FIG. 14B.

Figure 4:
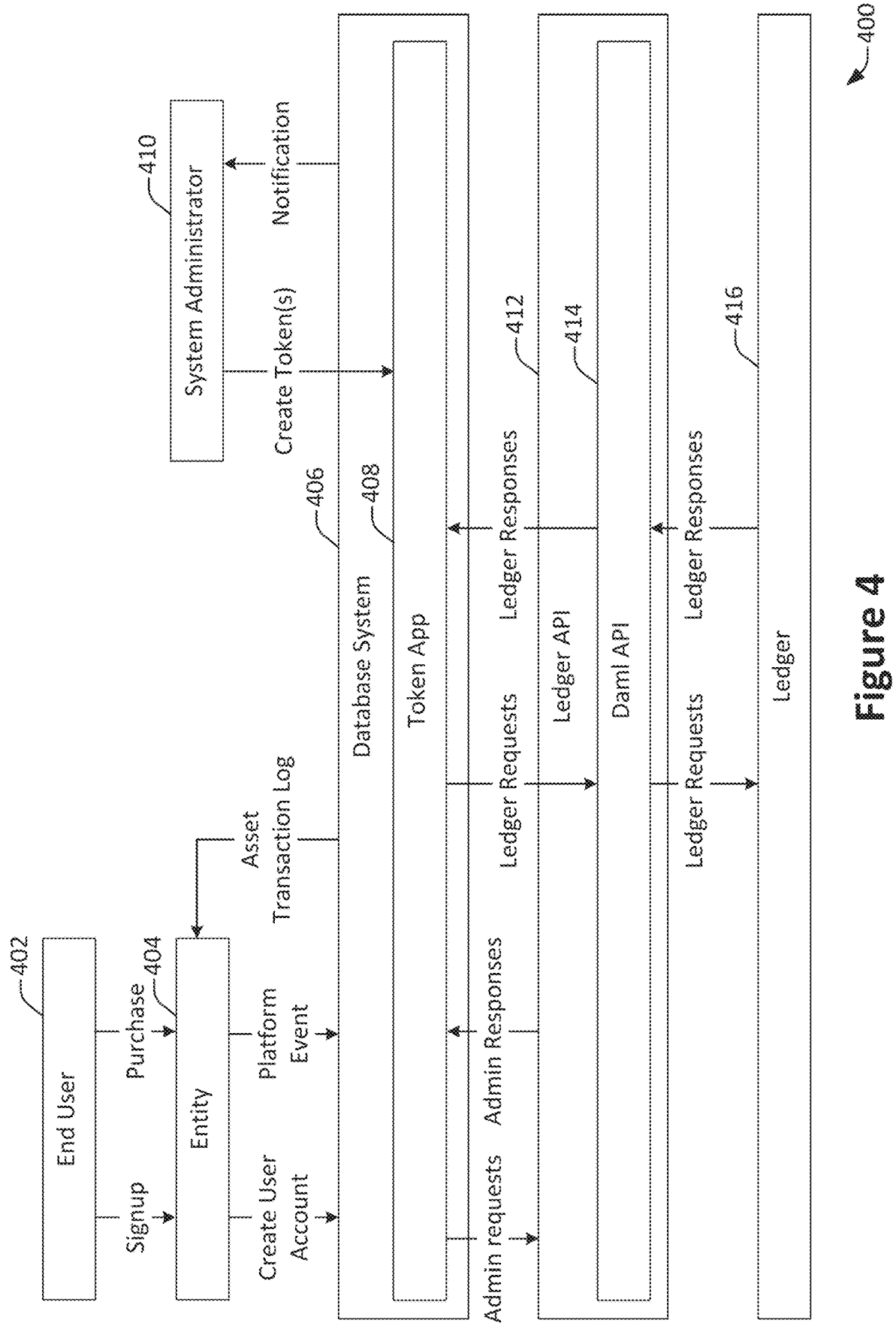
FIG. 4 illustrates an architecture diagram of a system facilitating interactions between a database system and a public trust ledger, configured in accordance with one or more embodiments.

FIG. 4 illustrates an architecture diagram of a system 400 facilitating interactions between a database system and a public trust ledger, configured in accordance with one or more embodiments. The system 400 includes an end user 402, an entity 404, a database system 406, a token app 408, a system administrator 410, a ledger API 412, a DAML API 414, and a ledger 416. FIG. 4 illustrates, at a high level, some of the interactions between such components, interactions which are explored in additional detail throughout the application.

According to various embodiments, the end user 402 may be a computing device associated with a user interacting with the entity 404. For example, the end user 402 may sign up to establish a public trust ledger account for accessing digital assets and may purchase, or be awarded, such assets. As used herein, the term "purchase" may refer to a transaction in which a digital asset is acquired in exchange for currency. However, the term "purchase" may also refer to other types of transactions, such as when a user is awarded a digital asset as an incentive or reward.

According to various embodiments, the entity 404 may be an organization accessing computer services provided by the database system 406. For example, the entity 404 may be a business accessing customer relations management services, data storage services, or any other computing services via the database system 406.

According to various embodiments, the database system 406 may be configured to provide various services to a variety of entities via the internet. Such services may include, but are not limited to CRM services, sales management services, account service management services, social media services, and training services. Examples of components included in a database system are discussed in additional detail throughout the application, for example with respect to the FIG. 13, FIG. 14A, and FIG. 14B.

According to various embodiments, the database system 406 may include a token app 408 for performing operations related to digital assets. The entity 404 may communicate with the database system 406 to perform operations such as creating an account for the end user 402, request to transfer a digital asset to the user's account, and/or receive information relating to such transactions.

According to various embodiments, the system administrator 410 may be a computing device authenticated to an individual configured to perform administrative operations on behalf of the entity 404. For example, the system administrator 410 may perform operations such as creating digital assets and associated tokens and/or receiving notifications related to digital assets.

According to various embodiments, the ledger API 412 may provide a point of contact for interacting with the public trust ledger. For example, the token app 408 may send and receive administrative communications with the ledger API 412. Such communications may include, for instance, various configuration operations.

The ledger API 412 may include a DAML API 414. According to various embodiments, the DAML API 414 may be configured to communicate directly with the public trust ledger 416. For instance, the DAML API 414 may be configured to perform operations such as specifying transactions for recording in the ledger 416.

FIG. 5 illustrates an example of a smart contract 500, configured in accordance with one or more embodiments. According to various embodiments, the smart contract 500 may be used to record transactions related to digital assets in a public trust ledger. The smart contract 500 includes a public key 502, a private key 504, a transaction interface 506, an owner ID 508, a smart contract ID list 510, one or more item tokens 512, and smart contract metadata 520.

In some implementations, the smart contract 500 is a computer program that may be included within a public trust ledger such as a blockchain. The smart contract 500 may then be executed to perform one or more operations, accessible via the transaction interface 506. Such transactions may include, but are not limited to: transferring ownership of one or more item tokens 512, providing one or more entries on the smart contract id list 510, and identifying the owner 508.

According to various embodiments, a smart contract may be implemented as a template and one or more instances of the template. For example, a template may be created for a particular type of token. Then, an instance of the smart contract template may be used to store some quantity of the token. For example, an instance of a smart contract may store one or more NFTs of a particular type and owned by a particular account. As another example, an instance of a smart contract template may store a quantity of a fungible token of a particular type and owned by a particular account. An instance of a smart contract template may be identified by, for example, an execution ID.

According to various embodiments, communication with the smart contract 500 may be secured via the public key 502 and the private key 504. The public key 502 is publicly available to anyone with access to the public trust ledger, while the private key 504 is private to the smart contract 502. Any system may employ the public key 502 to encrypt a message that can only be decrypted by the smart contract's private key. Similarly, the smart contrast 500 may encrypt a message using the private key 504. Although anyone may decrypt the message using the public key 502, the recipient of the message may verify that the message was sent by the smart contract 500 by virtue of its being decryptable using the smart contract's public key 502.

In some configurations, the public key 502 and the private key 504 may be used to encrypt some or all of the communication with the smart contract 500. Alternatively, or additionally, the public key 502 and the private key 504 may be used to facilitate a key exchange for the purpose of establishing a secure communication session between the smart contract 500 and another party to the communication session.

According to various embodiments, the owner ID 508 identifies the owner of the smart contract 500 and the included one or more tokens 512. The owner ID 508 may indicate an account in the public trust ledger. By authenticating as the owner associated with the owner ID 508, the owner may be able to authorize one or more transactions associated with the smart contract 500, such recording a transaction transferring the token 512 to a different party.

In some implementations, the smart contract ID list 510 may identify one or more other smart contracts associated with the smart contract 500. For example, the smart contract ID list 510 may identify one or more other smart contracts that are chained with the smart contract 500. In some configurations, one or more of the smart contracts identified by the smart contract ID list 510 may need to be executed in order for the smart contract 500 to be executed.

In some embodiments, the item token 512 identifies the digital asset being transferred. The token 512 includes a token ID 514, a digital asset ID 516, and a token type 518. The digital asset ID 516 is an identifier that identifies a digital asset recorded in a database system. For instance, the digital asset ID 516 may correspond with a value in column 314 for an entry in the digital asset table 310.

According to various embodiments, the token ID 514 is an identifier created when the token 512 is minted. The token ID 514 uniquely identifies the token 512 within the public trust ledger. The token type 518 indicates the type of token represented by the token 512. For example, the token type 518 may indicate ownership of the digital asset ID 516. As another example, the token type 518 may indicate ownership of one or more rights associated with the digital asset ID 516. Examples of such rights may include, but are not limited to: some or all of the copyrights associated with the digital asset identified by the digital asset ID 516, the right to transfer the digital asset identified by digital asset ID 516, or the right to transfer rights associated with the digital asset identified by digital asset ID 516.

In some implementations, a smart contract 500 may include a single token 512. Alternatively, a smart contract 500 may include more than one token. For example, the ERC-1155 standard as well as other types of token standards provide for multiple tokens within the same smart contract 500.

In some embodiments, the token 512 may be non-fungible. However, as discussed herein, techniques and mechanisms described herein may also be used in conjunction with fungible tokens.

Figure 6:
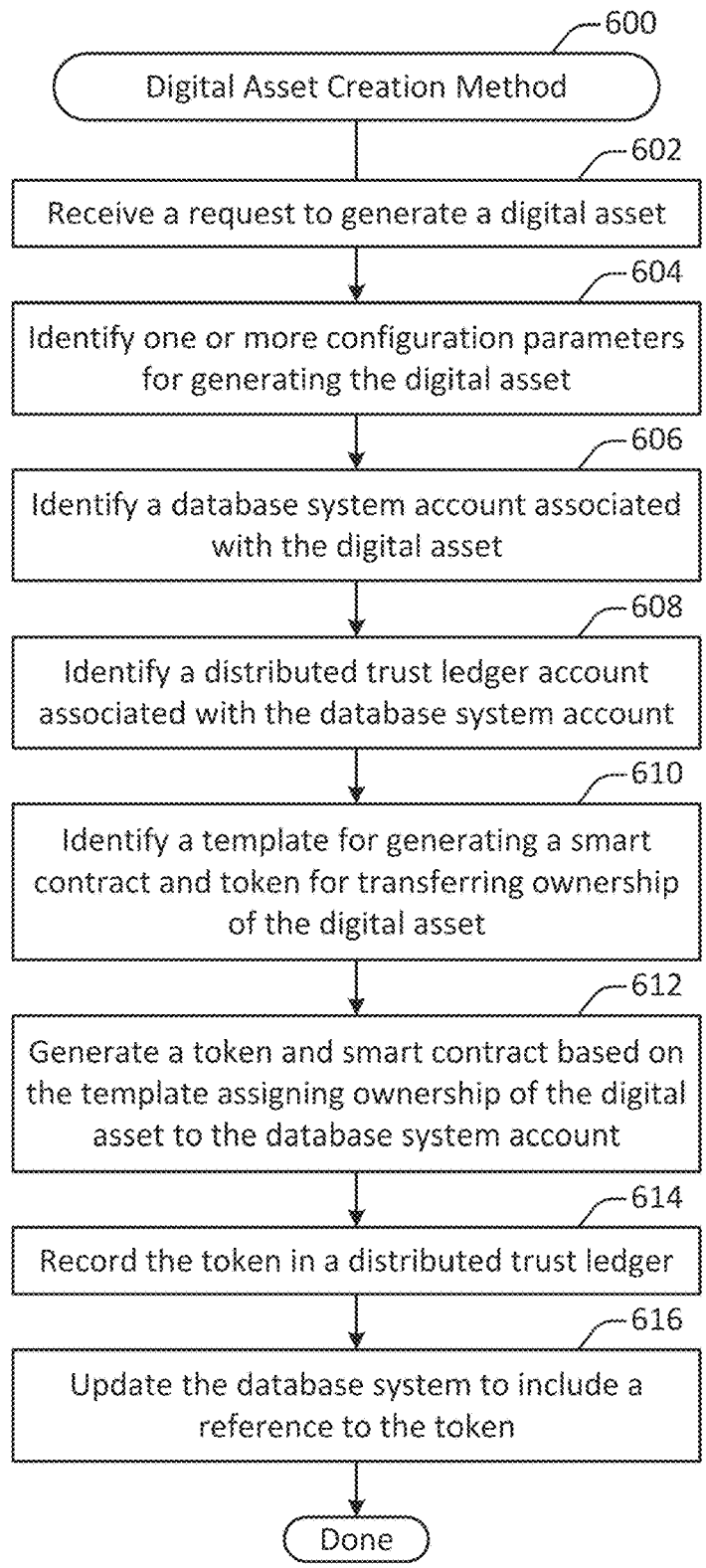
FIG. 6 illustrates an example of a method for creating a digital asset, performed in accordance with one or more embodiments.

According to various embodiments, the smart contract metadata 520 may include information stored within the smart contract that may be used for various purposes. For example, the smart contract metadata may include information used to determine whether a requested transfer is permissible. For instance, the smart contract metadata may include information such as the number of times a token may be transferred, the identities of one or more parties to whom the token may or may not be transferred, or other such constraints. Such information may be specified in any suitable format, such as JSON or XML FIG. 6 illustrates an example of a method 600 for creating a digital asset, performed in accordance with one or more embodiments. According to various embodiments, the method 600 may be performed at one or more computing devices within an on-demand computing services environment. The method 600 may be performed in order to create a digital asset and one or more associated tokens with one or more corresponding smart contracts.

A request to generate a digital asset is received at 602. According to various embodiments, the request may be received within the on-demand computing services environment. For example, an asset manager may provide user input requesting that the digital asset be generated. As another example, a digital asset may be generated automatically, for instance based on an automated script that is executed at a designated time or upon detection of a triggering condition. For instance, when a reference to a physical asset is added to the database system, a configuration parameter may indicate that a corresponding digital asset should be created as well.

One or more configuration parameters for generating the digital asset are identified at 604. In some implementations, a configuration parameter may be specified via user input. Alternatively, or additionally, a configuration parameter may be determined automatically, for instance based on a predetermined configuration file or a default configuration value.

According to various embodiments, various types of configuration parameters may be employed. Some parameters may relate to one or more rights that may be conferred by ownership of a digital token. Such parameters may include, but are not limited to: one or more rights to a digital asset, whether a right may be transferred, the number of times a right may be transferred, whether rights are separable or must be transferred together, and whether ownership may be fractional. Some parameters may relate to the nature of one or more tokens. Such parameters may include, but are not limited to: the quantity of tokens created, media content such as images, videos, sounds, or animations for creating the tokens, and/or one or more templates for smart contract and/or token creation.

In particular embodiments, the one or more configuration parameters may include metadata for generating the digital asset. For example, a product object as stored in the database system may be extensible in that in can include additional metadata. That metadata may include, for example, structured and/or unstructured data or rules, which may be used to generate token metadata for storing in the public trust ledger. That token metadata may be used in a variety of ways, such as for validating a transfer request against one or more transfer rules.

In particular embodiments, metadata may be stored in the public trust ledger in a privacy-sensitive manner. For example, personally identifying information such as a social security number, email address, or other such data may be hashed, and the resulting hash values stored in the public trust ledger. In this way, ownership of a token in the public trust ledger may be tied not only to a database account identifier, but also to personally identifying information. For instance, a verification process may involve hashing a known element of personally identifier information and ensuring that the resulting hash value matches information stored in the trust ledger. However, the personally identifying information need not be stored in the trust ledger in a cleartext state and therefore need not be publicly and permanently revealed.

A database system account associated with the digital asset is identified at 606. In some embodiments, the database system account may be identified based on the request received at 602. For instance, the request may be received from a computing device having authenticated in association with the database system account.

In some implementations, the database system account may correspond to an individual. Alternatively, the database system account may correspond to a different type of entity, such as an organization.

In particular embodiments, the database system may be a multitenant database configured to store information associated with multiple entities, or tenants, in the same database table. In such a configuration, the database system account may correspond to one of the tenants.

A public trust ledger account associated with the database system account is identified at 608. According to various embodiments, the public trust ledger account may be identified by consulting a correspondence table within the database system that links database system accounts with public trust ledger accounts. An example of such a table is shown in FIG. 3.

A template for generating a smart contract and token for transferring ownership of the digital asset is identified at 610. In some implementations, the template may identify attributes of the smart contract and/or token such as one or more of the parameters identified at 604.

A token assigning ownership of the digital asset to the database system account is generated based on the template at 612. According to various embodiments, generating the token may involve operations such as identifying attributes other than those specified in the template. For instance, a set of NFTs may be generated for various color combinations of a digital asset, such as an item of digital apparel that is usable in conjunction with a digital avatar. In such a situation, attributes specific to the NFT may be combined with the template identified at 610 and the distributed trust ledger account 608 to generate the NFT.

The smart contract and token are recorded in a public trust ledger at 614. In some implementations, the smart contract and token may be recorded by executing a token minting process. The token minting process may involve executing a smart contract on a public blockchain, such as the Ethereum blockchain. However, techniques and mechanisms described herein are not limited to Ethereum, and instead are applicable to any blockchain or other public trust ledger that supports smart contracts. The minting process may involve one or more operations such as confirming the token as an asset on the blockchain, updating the account balance of the blockchain account identified at 326 to include the minted token, adding one or more transactions confirming such information to a block, and confirming the block to others within the blockchain network. The smart contract may be executed in part based on computations performed by one or more blockchain miners.

In particular embodiments, such as when the token is a fungible token, recording the token in a distributed trust ledger may involve registering the token in an exchange as exchangeable. Fungible tokens may include, but are not limited to, branded tokens, cryptocurrency, loyalty points, or other such interchangeable assets.

According to various embodiments, fungible and non-fungible tokens may vary in any of several ways. For example, non-fungible token may be required to possess one or more unique attributes. As another example, fungible tokens may be configured so as to be subdividable.

The database system is updated to include the reference to the token at 616. According to various embodiments, updating the database system may include generating or updating a database entry to include one or more identifiers associated with the token. For instance, a token ID, a token smart contract ID, a digital trust ledger account ID, and/or any other relevant information may be added to the database system. Additional details regarding the types of information that may be stored are described with respect to FIG. 3.

According to various embodiments, the method 600 may be performed in order to generate more than one digital asset. For instance, a set of digital assets may be generated for virtual clothing to be worn by digital avatars. In such a situation, a digital asset may be generated for each of a variety of combinations of clothing colors.

Figure 7:
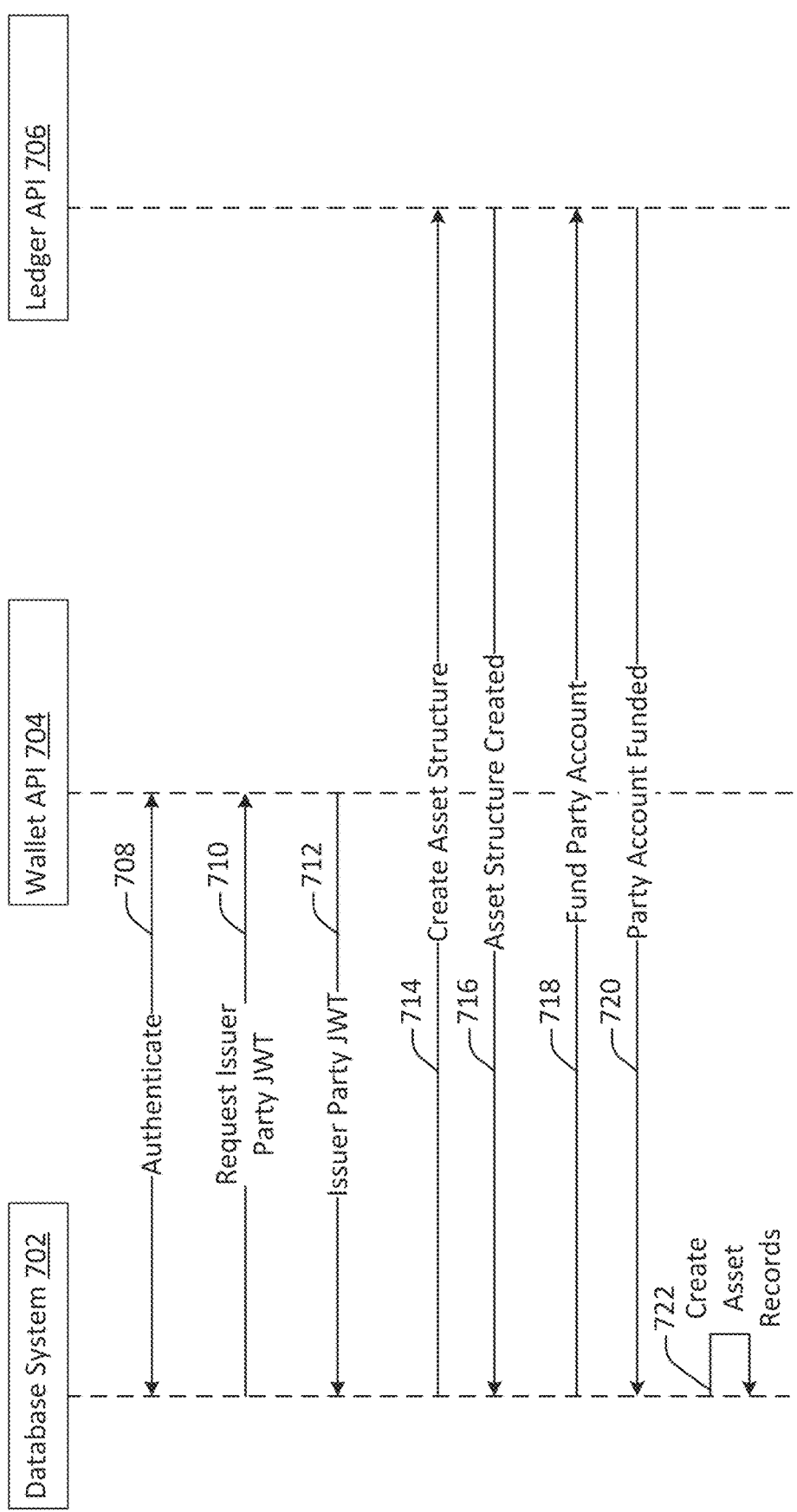
FIG. 7 illustrates an example of a procedure for minting a token, performed in accordance with one or more embodiments.

FIG. 7 illustrates an example of a procedure 700 for minting a token, performed in accordance with one or more embodiments. According to various embodiments, the token minting procedure may involve interactions between the database system 702, the wallet API 704, and the ledger API 706.

At 708, upon receiving a request to mint a token, the database system may authenticate the party associated with the request to the wallet API 704. For instance, the database system may verify to the wallet API that the database system includes has access to authentication credentials associated with the request issuer.

An issuer party JSON web token (JWT) is requested at 710 and returned at 712. According to various embodiments, a JWT is a token that facilitates the creation of data. A JWT payload may include JSON that asserts some number of claims. A JWT may be signed an/or encrypted. When a request is made by the database system to mint a token, receiving a JWT from the wallet API 704 allows the database system 702 to interacting with the ledger API 706 to mint the token on behalf of the wallet API 704. That is, the database system 702 may use the JWT to effectively authenticate as a particular wallet to the ledger API 706. It should be noted that a JWT is only one example of the way in which such authentication may occur.

A request to create an asset structure for the token is sent to the ledger API 706 at 714, and a response message is returned at 716. According to various embodiments, the request sent at 714 may define one or more characteristics of the token, for instance as discussed with respect to the method 600 shown in FIG. 6.

A request to fund a party account is sent to the ledger API 706 at 718, and a response message is returned at 720 indicating that the party account has been funded. According to various embodiments, the request sent at 718 may be used to assign the asset to the wallet identified by the issuer party JWT returned at 712.

At 722, one or more records of the asset or assets are created in the database system. For example, one or more records discussed with respect to the database system 300 shown in FIG. 3 may be created.

Figure 8:
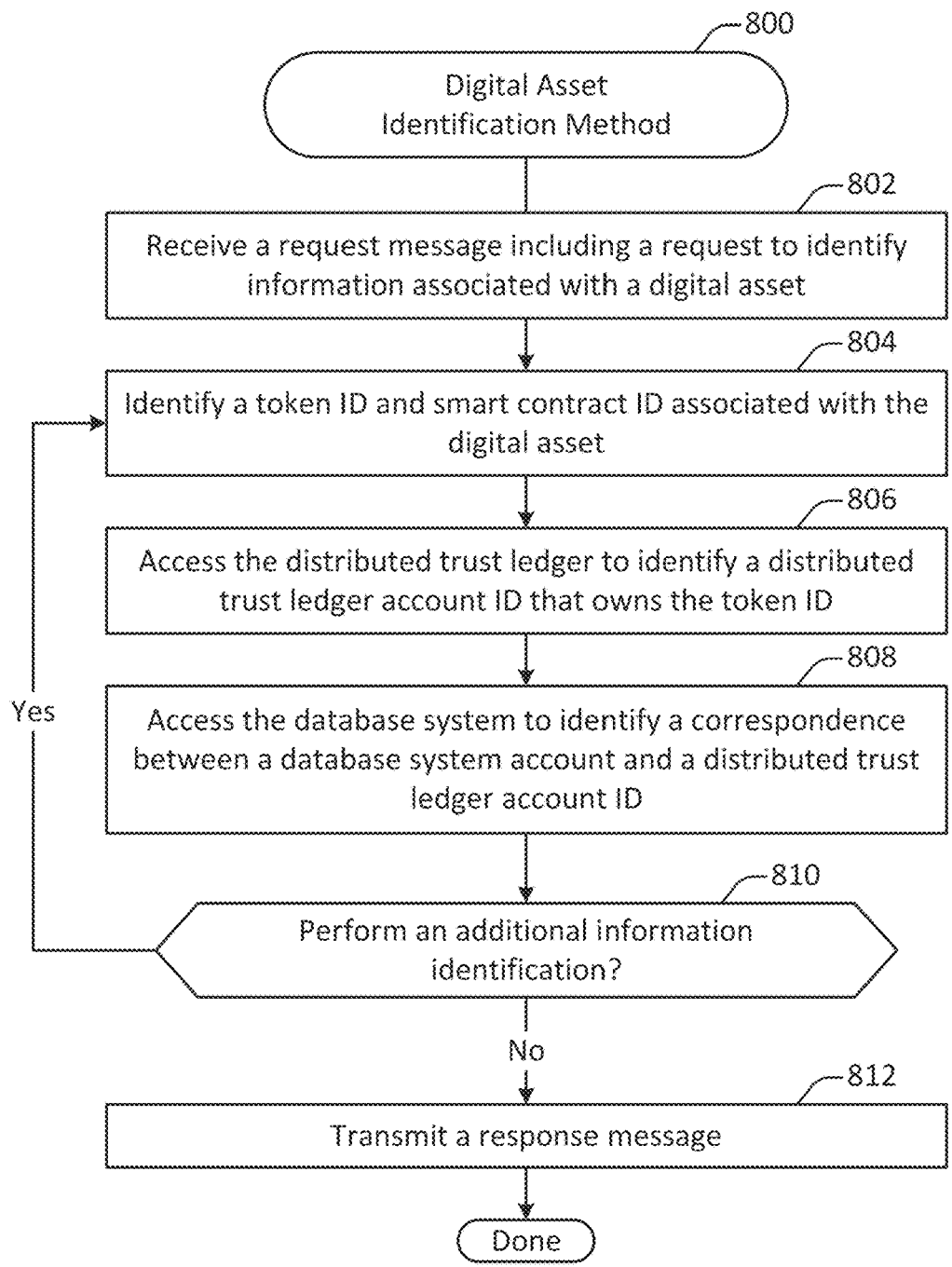
FIG. 8 illustrates an example of a method for identifying one or more parties associated with a digital asset, performed in accordance with one or more embodiments.

FIG. 8 illustrates an example of a method 800 for identifying information associated with a digital asset, performed in accordance with one or more embodiments. In some implementations, the method 800 may be performed at an on-demand database system. Alternatively, or additionally, the method 800 may be performed at a system configured to analyze a public trust ledger.

A request message including a request to identify information associated with a digital asset is received at 802. According to various embodiments, the method 800 may be used to identify any of various types of information, such as a current or previous owner of an NFT associated with a digital asset or a digital asset own by a particular party.

According to various embodiments, the request may include any of various request parameters used to query digital asset information. For example, the request may include a token identifier associated with a digital asset. As another example, the request may include a trust ledger account ID that may own a digital asset. As another example, the request may include a database system account ID that may own a digital asset. As yet another example, the request may include a smart contract ID that may include a token for a digital asset. Various types of queries are possible. As still another example, the request may include a digital asset identifier associated with the database system.

A token ID and smart contract ID associated with the digital asset are identified at 804. According to various embodiments, such information may be identified in any of various ways. For example, such information may be included with the request received at 802. As another example, such information may be determined or verified by accessing the database system. For instance, one or more of the tables shown in FIG. 3 may be queried using information included in the request. As yet another example, such information may be determined or verified by analyzing the public trust ledger.

The public trust ledger is accessed at 806 to identify a public trust ledger account ID that owns the token ID. In some implementations, information from the public trust ledger may be accessed by syncing some or all of the distributed public trust ledger with a local machine. Alternatively, or additionally, a trusted platform that provides access to the public trust ledger may be queried to access the information.

The database system is accessed at 808 to identify a correspondence between a database system account and a public trust ledger ID. According to various embodiments, accessing the database system may involve querying the table 330 shown in FIG. 3. For example, a database account ID may be used to identify a corresponding trust ledger account ID. As another example, a trust ledger account ID may be used to identify a corresponding database account ID.

According to various embodiments, when an identifier is identified, additional information may be identified as well. For instance, information about an database system account or public trust ledger account, such as the account name or other contact information, may be returned.

A determination is made at 810 as to whether to perform additional information verification. In some implementations, the determination may be made at least in part on the nature of the query. For instance, a query may indicate a request to identify all owners of rights that pertain to a particular digital asset. Alternatively, or additionally, the determination made at 810 may be made at least in part based on user input. For instance, a user may provide a request to identify additional information pertaining to a different or related right or digital asset.

According to various embodiments, queries may be linked in various ways. For example, to identify a copyright holder associated with a digital asset, the system may first identify a token and associated token owner for the digital asset. That information may then be used to identify a related NFT associated with copyright for the digital asset.

A response message is transmitted at 812. According to various embodiments, the response message may include any or all of the information discussed with respect to FIG. 8, and/or any other suitable information.

According to various embodiments, the operations shown in FIG. 8 may be performed in an order different than that shown. For example, an identification process may start with a database account ID and then identify information such as one or more tokens and corresponding digital assets owned by a public trust ledger account associated with that database account ID. As another example, an identification process may start with a public trust ledger ID and then identify information such as a database account ID corresponding with the public trust ledger ID. Various types and combinations of queries are possible.

Figure 9:
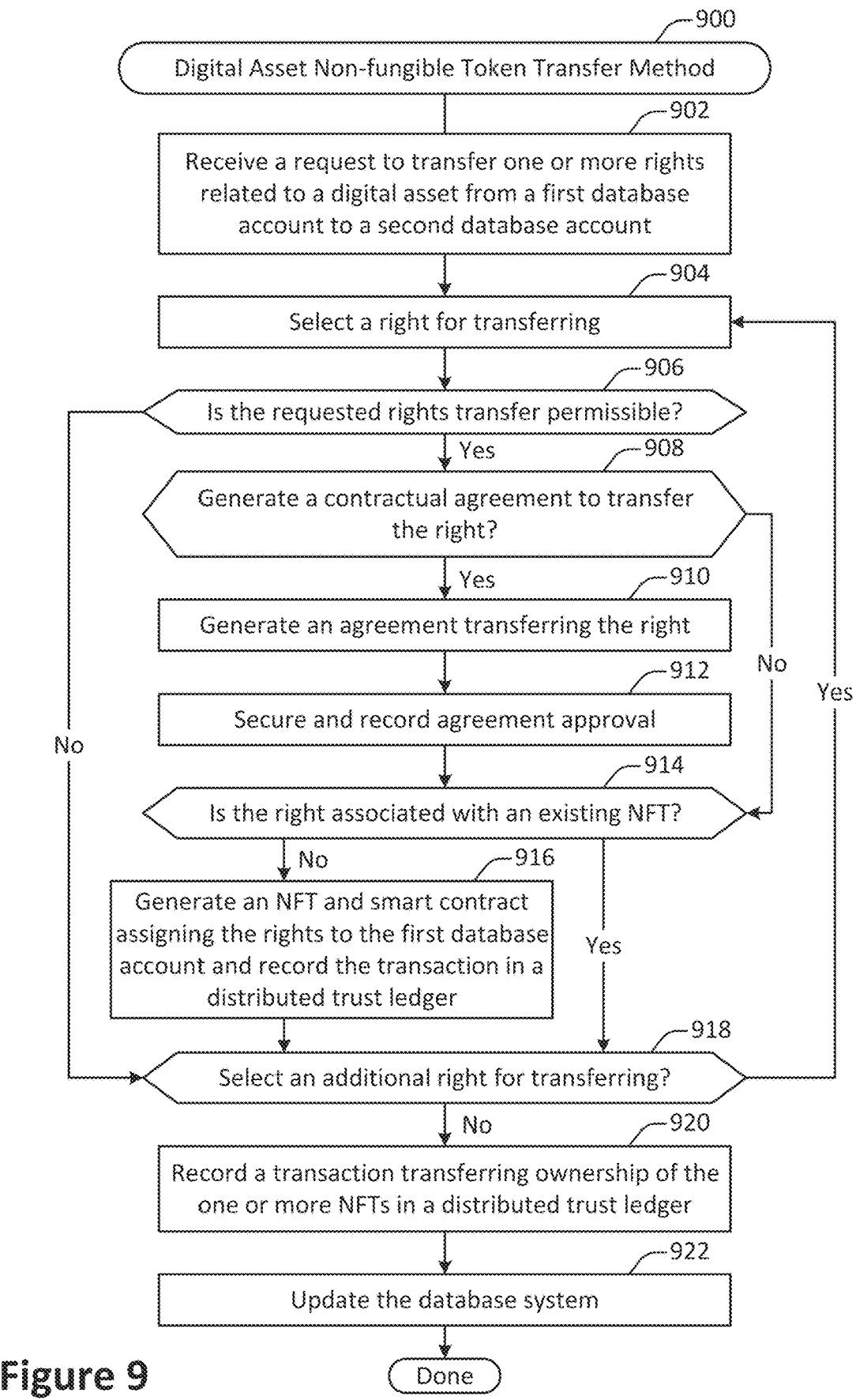
FIG. 9 illustrates an example of a method for transferring a digital asset non-fungible token, performed in accordance with one or more embodiments.

FIG. 9 illustrates an example of a method 900 for transferring a digital asset, performed in accordance with one or more embodiments. The method 900 may be performed at one or more computing systems within an on-demand database system. The method 900 may be used to transfer one or more NFTs providing ownership of a digital asset and/or other rights related to the digital asset from a first party to a second party.

A request is received at 902 to transfer a one or more rights for a digital asset from a first database account to a second database account. In some implementations, the request may be generated based on user input. For instance, a user associated with one database account may generate a request to transfer a right to a second database account. In some embodiments, the request may be generated automatically. For instance, the request may be generated when the database system detects that a transaction related to a digital asset has occurred.

A right is selected for transferring at 904. In some implementations, the right selected for transferring may be identified in the request received at 902. Alternatively, or additionally, one or more rights may be selected by a user, for instance by providing input via a user interface.

According to various embodiments, a digital asset transfer method may be used to transfer multiple NFTs associated with a digital asset. For example, a database account may transfer a first NFT providing ownership rights to the digital asset, a second NFT providing a limited copyright over the digital asset, and a third NFT providing a right to modify the digital asset. Alternatively, or additionally, a digital asset transfer method may be used to transfer an NFT providing rights over a digital asset without transferring ownership of the digital asset. For example, a database account may transfer a right to modify a digital asset without transferring ownership of the digital asset.

A determination is made at 906 as to whether the requested rights transfer is permissible. According to various embodiments, the determination made at 906 may involve determining whether rights associated with the digital asset are owned by the first database account. In some embodiments, one or more rights may be associated with the first database account by default. For instance, if the digital asset was created by the holder of the first database account, then that party may be assumed to hold copyright, transfer rights, and other such rights associated with the digital assets.

In some implementations, one or more rights may be associated with the first database account by virtue of the first database account owning an NFT associated with the rights. The ownership status of an NFT associated with the right may be verified in one or more of various ways. For example, the database system may record the current owner of the NFT, as discussed with respect to the database system 300 configured as shown in FIG. 3. As another example, the ownership of the NFT may be validated by consulting the public trust ledger. An example of a method for verifying NFT ownership by interacting with a public trust ledger is shown in the method 800 in FIG. 8.

In some implementations, the determination made at 906 may involve evaluating one or more validation rules determined based on metadata stored within the smart contract. For example, the smart contract may include a rule prohibiting the token from being transferred more than a designated number of times. As another example, the smart contract may include a rule prohibiting the token from being transferred to a particular entity.

A determination is made at 908 as to whether to generate a contractual agreement to transfer the right. According to various embodiments, the determination may be made at least in part based on the right being transferred. For example, ownership rights may not need a contractual agreement to facilitate a transfer, while a contractual agreement may be needed to transfer a copyright. As another example, a right may be transferrable without a signed contractual agreement in one jurisdiction, whereas a different jurisdiction may require a signed contractual agreement to effectuate a transfer. Such requirements may be stored as metadata within the database system and/or within the public trust ledger.

If a determination to generate a contractual agreement is made, then at 910 such an agreement may be generated. In some implementations, generating a contractual agreement may involve identifying a template associated with the type of rights being transferred and then completing that template with information associated with the specific transfer being effectuated. For instance, a template for transferring copyright over an item of digital apparel for an avatar may be filled out with information such as the identity of the party that currently owns the item, the identity of the party to whom the item is being transferred, and identifying information for the item being transferred.

Approval of the agreement is secured and recorded at 912. According to various embodiments, securing approval may be performed in any of various ways. For example, a party may sign an agreement using a digital signature mechanism. As another example, an agreement may be printed, physically signed by a representative of the party, and scanned. The particular method used to secure approval of the agreement may depend, for instance, on the type of rights being transferred and any specific requirements (e.g., jurisdictional requirements, requirements imposed by the parties, etc.) associated with the transfer of such rights.

In some implementations, approval may need to be secured from both parties. For instance, the transfer of ownership or copyright may involve securing approval from both the transferee and the transferor. Alternatively, approval may only need to be secured from one of the parties. For example, for some rights approval may need to be obtained only for the party transferring the right.

A determination is made at 914 as to whether the right is associated with an existing NFT. According to various embodiments, such a determination may be made by querying the database system 300 shown in FIG. 3.

If the right is not associated with an existing NFT, an NFT and associated smart contract assigning the rights to the first database account may be created and recorded in a public trust ledger at 916. The creation and recordation of such an NFT may be substantially similar to the operations 510-516 shown in FIG. 5.

In some implementations, more than one NFT may be created, for instance in the event that more than one right is selected for transfer. In such a situation, the creation and recordation of NFTs and smart contracts for the different rights may be performed as part of the same transaction.

A determination is made at 918 as to whether to select an additional right for transferring. According to various embodiments, additional rights may be selected until all rights identified for transferring are associated with a respective NFT and contractual agreements have been generated and approved wherever such agreements are indicated.

At 920, a transaction transferring ownership of the one or more NFTs is recorded in a public trust ledger. In some embodiments, multiple NFT transfers may be grouped into a single public trust ledger transaction. Alternatively, or additionally, an NFT transfer may be treated as a distinct transaction for recording within the public trust ledger.

The database system is updated at 922. According to various embodiments, updating the database system may involve storing an indication of the transactions recorded at operations 908 or 920. For instance, the database system 300 shown in FIG. 3 may be updated to indicate that the second party is now the owner and/or rights holder associated with the digital asset and that the first party is no longer the owner and/or rights holder.

In particular embodiments, NFT creation and/or transfer transactions may be combined in various ways. For example, the ERC-1155 standard allows for including multiple NFTs within the same smart contract. Such an approach may help to reduce the transaction costs associated with recording transactions in the public trust ledger.

Figure 10:
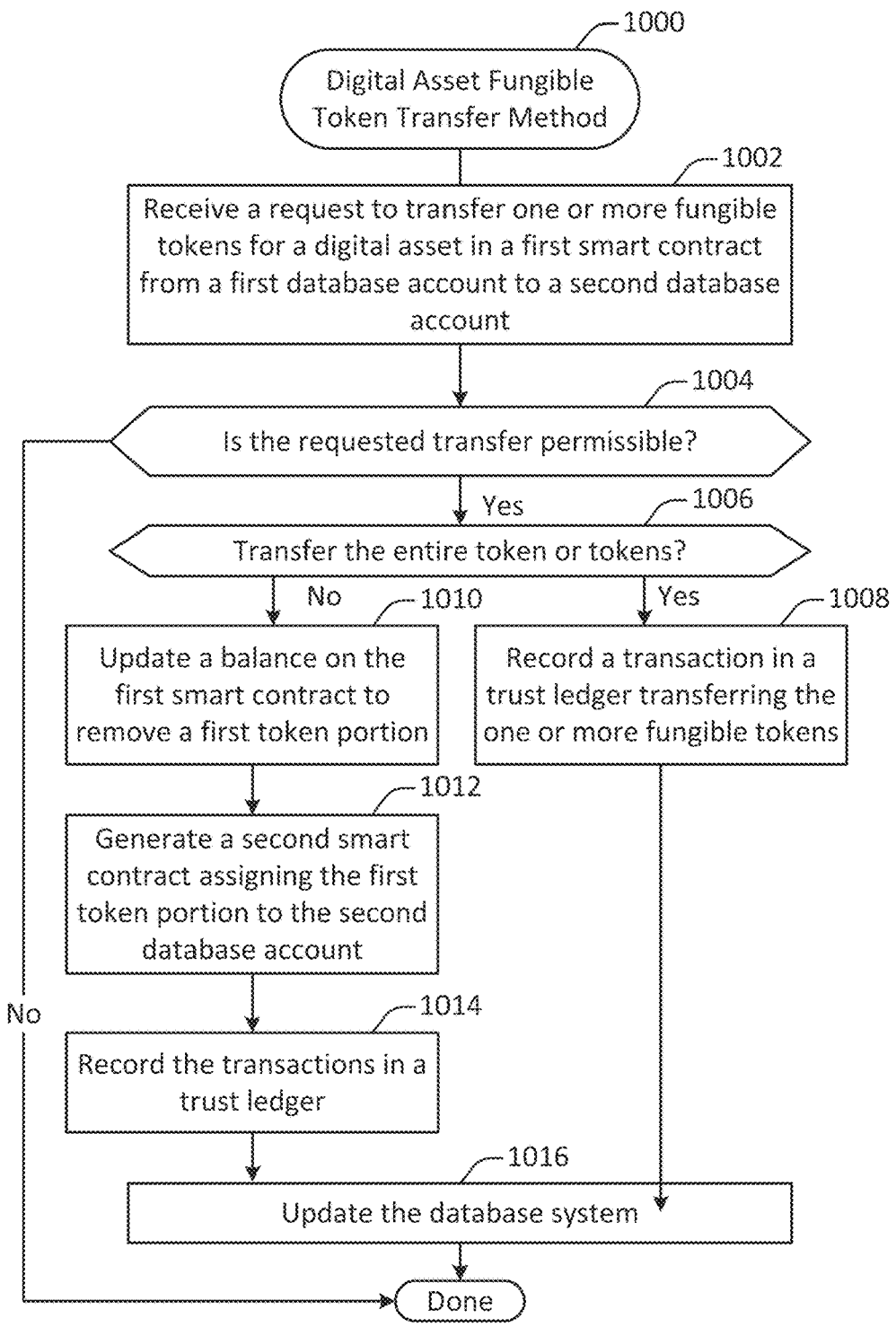
FIG. 10 illustrates an example of a method for transferring a digital asset fungible token, performed in accordance with one or more embodiments.

FIG. 10 illustrates an example of a method 1000 for transferring a digital asset fungible token, performed in accordance with one or more embodiments. The method 1000 may be performed at one or more computing systems within an on-demand database system. The method 1000 may be used to transfer one or more fungible token providing ownership of a digital asset and/or other rights related to the digital asset from a first party to a second party.

A request is received at 1002 to transfer a one or more fungible tokens for a digital asset from a first database account to a second database account. In some implementations, the request may be generated based on user input. For instance, a user associated with one database account may generate a request to transfer a right to a second database account. In some embodiments, the request may be generated automatically. For instance, the request may be generated when the database system detects that a transaction related to a digital asset has occurred.

A determination is made at 1004 as to whether the requested transfer is permissible. According to various embodiments, the determination made at 1004 may involve determining whether rights associated with the digital asset are owned by the first database account. In some embodiments, one or more rights may be associated with the first database account by default. For instance, if the digital asset was created by the holder of the first database account, then that party may be assumed to hold copyright, transfer rights, and other such rights associated with the digital assets.

In some implementations, one or more rights may be associated with the first database account by virtue of the first database account owning a token associated with the rights. The ownership status of a token associated with the right may be verified in one or more of various ways. For example, the database system may record the current owner of the token, as discussed with respect to the database system 300 configured as shown in FIG. 3. As another example, the ownership of the token may be validated by consulting the public trust ledger. An example of a method for verifying token ownership by interacting with a public trust ledger is shown in the method 800 in FIG. 8.

In some implementations, the determination made at 1004 may involve evaluating one or more validation rules determined based on metadata stored within the smart contract. For example, the smart contract may include a rule prohibiting the token from being transferred more than a designated number of times. As another example, the smart contract may include a rule prohibiting the token from being transferred to a particular entity.

A determination is made at 1006 as to whether to transfer the entire token or tokens. According to various embodiments, fungible tokens may be configured so as to be subdivided. For instance, a quantity of cryptocurrency, loyalty tokens, branded tokens, or other such tokens may be subdivided and transferred only in part to the second entity.

According to various embodiments, whether to subdivide the token or tokens, as well as the amount to transfer if subdivided, may be indicated in the request received at 1002. Alternatively, or additionally, user input indicating such information may be received. As still another possibility, such information may be determined automatically, for instance by matching the subdivided portion to a quantity need to complete a purchase.

When it is determined to transfer the entire token or quantity of tokens, then at 1008 a transaction transferring the one or more tokens is recorded in the trust ledger. According to various embodiments, the transaction may be recorded by executing the first smart contract.

If instead a determination is made to transfer only a portion of the tokens, then at 1010 a balance on the first smart contract may be updated to remove a first portion of the token or tokens. At 1012, a second smart contract may be generated that assigns the first token portion to the second database account. Then, the transactions are recorded in a trust ledger at 1014. According to various embodiments, the transaction may be recorded at least in part by executing the first smart contract.

The database system is updated at 1016. According to various embodiments, updating the database system may involve storing an indication of the transactions recorded at operations 1008 or 1014. For instance, the database system 300 shown in FIG. 3 may be updated to indicate that the second party is the owner of the token, tokens, or token portions that were transferred, and that the first party is no longer the owner of the token, tokens, or token portions.

In particular embodiments, token creation and/or transfer transactions may be combined in various ways. For example, the ERC-1155 standard allows for including multiple tokens within the same smart contract. Such an approach may help to reduce the transaction costs associated with recording transactions in the public trust ledger.

Figure 11:
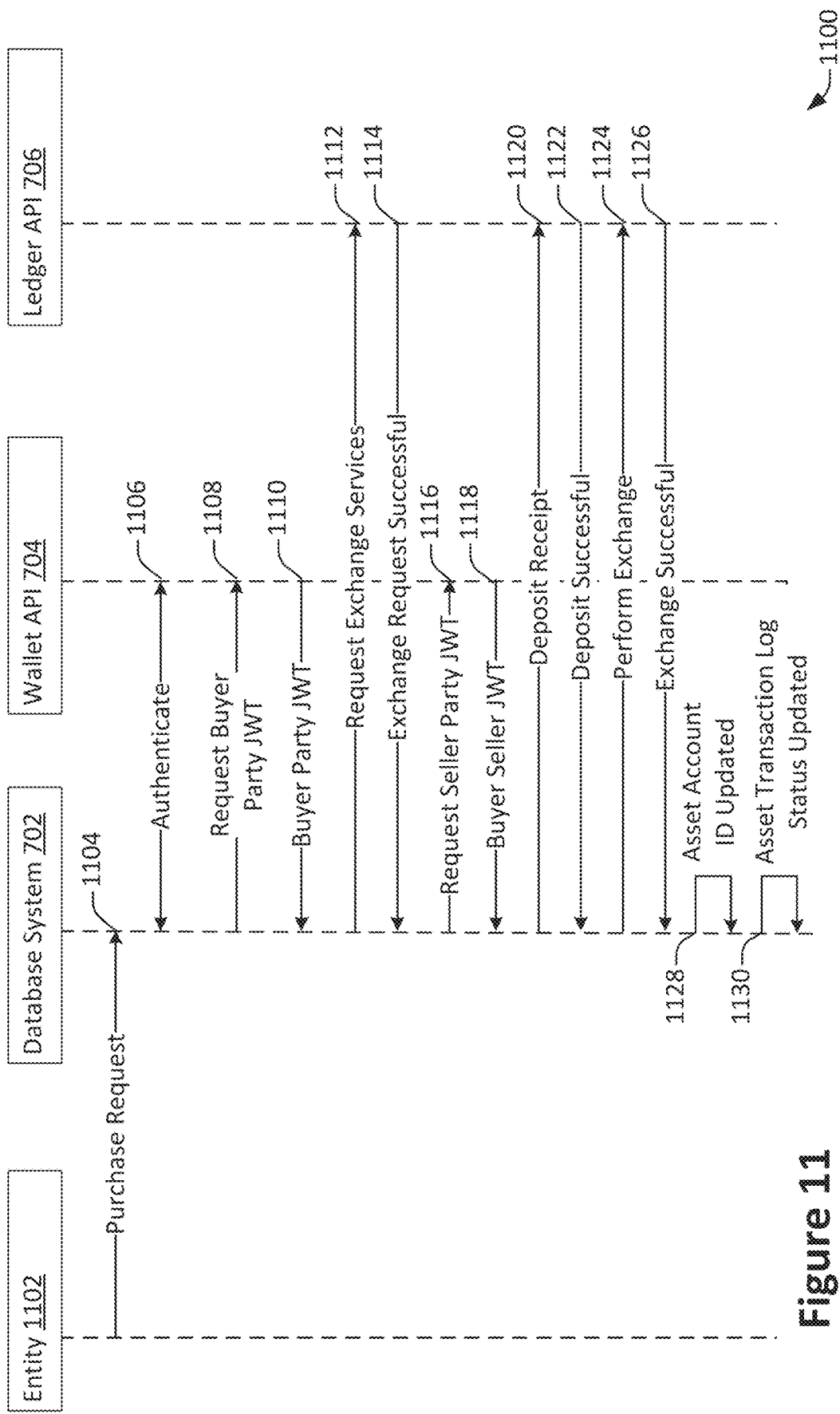
FIG. 11 illustrates an example of a messaging procedure for transferring a token, performed in accordance with one or more embodiments.

FIG. 11 illustrates a messaging procedure 1100 for transferring a token, performed in accordance with one or more embodiments. According to various embodiments, the messaging procedure 1100 may be used in conjunction with one or more techniques or mechanisms described herein, such as the methods 900 and 1000 shown in FIGS. 9 and 10.

A purchase request is sent from an entity 1102 at 1104. According to various embodiments, the entity 1102 may be any suitable entity within the database system. For example, the entity 1102 may be a computing device authenticated as a user or organization having a database system account. The purchase request may indicate one or more fungible and/or non-fungible tokens that the entity would like to purchase.

At 1106, upon receiving a request to purchase a token, the database system may authenticate the party associated with the request to the wallet API 704. For instance, the database system may verify to the wallet API that the database system includes has access to authentication credentials associated with the request issuer.

A buyer party JSON web token (JWT) is requested at 1108 and returned at 1110. According to various embodiments, when a request is made by the database system to purchase a token, receiving a JWT from the wallet API 704 allows the database system 702 to interacting with the ledger API 706 to transfer the token to the buyer's wallet. That is, the database system 702 may use the JWT to effectively authenticate as a particular wallet to the ledger API 706. It should be noted that a JWT is only one example of the way in which such authentication may occur.

Exchange services are requested at 1112 and confirmed at 1124. According to various embodiments, requesting exchange services may involve, for instance, initiating communication with the appropriate node. For example, the communication may involve establishing a communication with the node, verifying that the seller party is the owner of the token subject to the requested purchase, and/or verifying that the requested purchase is permissible.

A seller party JSON web token (JWT) is requested at 1116 and returned at 1118. According to various embodiments, when a request is made by the database system to purchase a token, receiving a JWT from the wallet API 704 allows the database system 702 to interacting with the ledger API 706 to transfer the token from the seller's wallet. That is, the database system 702 may use the JWT to effectively authenticate as a particular wallet to the ledger API 706. It should be noted that a JWT is only one example of the way in which such authentication may occur.

At 1120, the database system 702 requests to deposit the token from the seller's wallet. The deposit is confirmed at 1122. At 1124, the database 702 sends a request to perform the exchange. The exchange is confirmed at 1126. According to various embodiments, operations 1120 and 1122 may relate to, for example, the exchange of payment. The operations 1124 and 1126 may relate to the exchange of one or more tokens after payment is made and confirmed.

The asset account ID is updated in the database system at 1128. According to various embodiments, updating the asset account ID may involve updating a database entry associated with the digital asset to indicate that the purchaser is now the owner of the digital asset.

The asset transaction log status is updated at 1120. According to various embodiments, updating the asset transaction log status may involve creating or modifying an entry in the transaction table to indicate that the transaction has been completed.

A request to create an asset structure for the token is sent to the ledger API 706 at 714, and a response message is returned at 716. According to various embodiments, the request sent at 714 may define one or more characteristics of the token, for instance as discussed with respect to the method 600 shown in FIG. 6.

A request to fund a party account is sent to the ledger API 706 at 718, and a response message is returned at 720 indicating that the party account has been funded. According to various embodiments, the request sent at 718 may be used to assign the asset to the wallet identified by the issuer party JWT returned at 712.

At 722, one or more records of the asset or assets are created in the database system. For example, one or more records discussed with respect to the database system 300 shown in FIG. 3 may be created.

Figure 12:
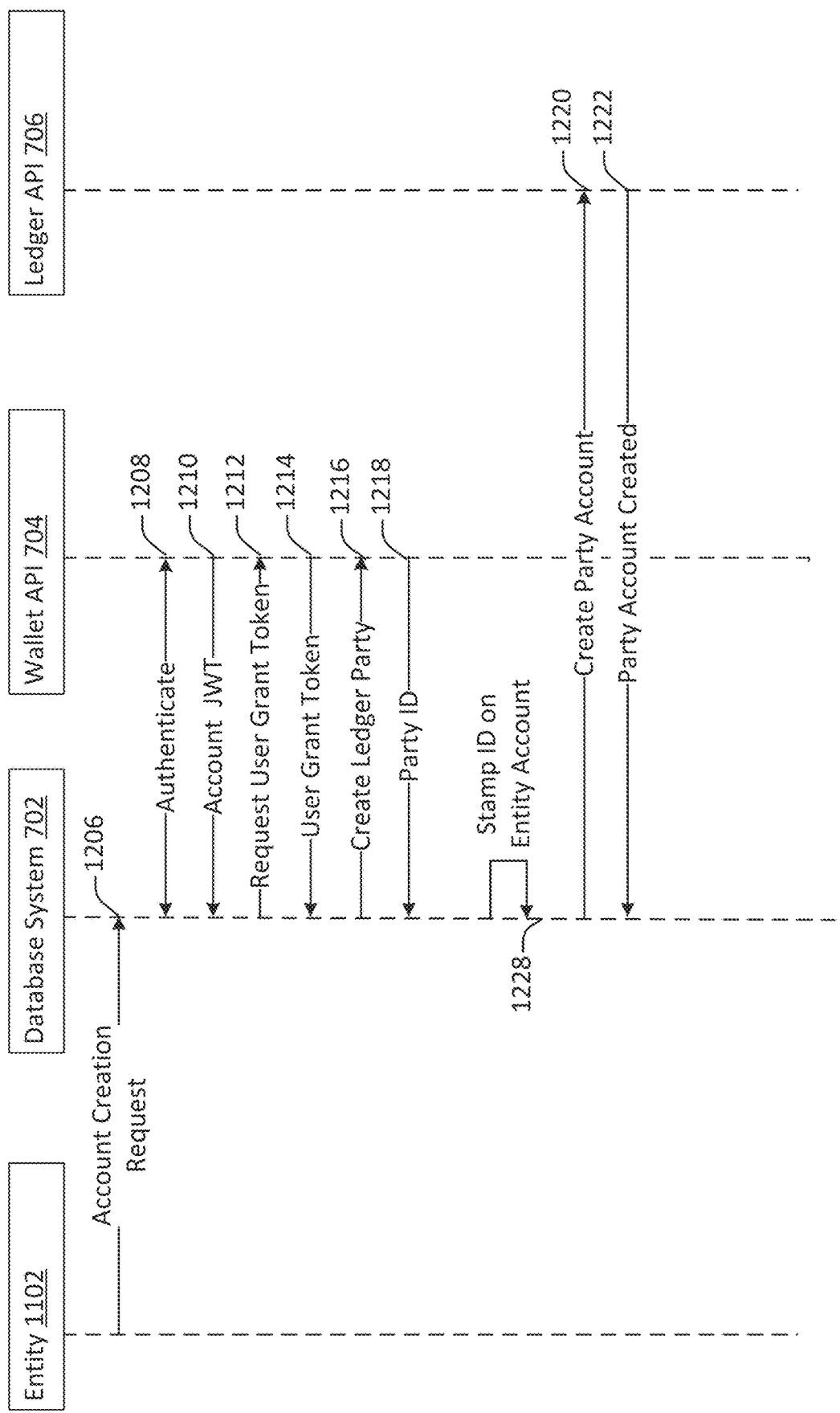
FIG. 12 illustrates an example of a messaging procedure for creating an account, performed in accordance with one or more embodiments.

FIG. 12 illustrates a messaging procedure 1200 for creating an account, performed in accordance with one or more embodiments. According to various embodiments, the messaging procedure 1200 may be used in conjunction with one or more techniques or mechanisms described herein, such as for example to create an account that may be used to issue or purchase tokens.

An account creation request is sent from an entity 1102 at 1206. According to various embodiments, the entity 1102 may be any suitable entity within the database system. For example, the entity 1102 may be a computing device authenticated as a user or organization having a database system account. The account creation request may include information identifying and authenticating the entity associated with the request.

At 1208, upon receiving a request to purchase a token, the database system may authenticate the party associated with the request to the wallet API 704. The wallet API 704 may respond by providing an account JWT at 1210, configured as discussed with respect to the methods 700 and 1100 shown in FIGS. 7 and 11.

A request user grant token is requested at 1212 and returned at 1214. According to various embodiments, the request user grant token may be used by the database system 702 to uniquely identify a new user being created. The new user may be associated with a new wallet created based on interacting with the wallet API 704, and the user's information recorded in the ledger API 706.

A request to create a party is sent to the wallet API at 1216, and the party's ID is returned at 1218. The party's ID is stamped on the entity's database system account at 1228. According to various embodiments, the party ID may uniquely identify the party in the distributed trust ledger.

At 1220, a request to record the creation of the party account in the public trust ledger is sent to the ledger API 706. A confirmation that the party account was recorded is returned at 1222.

Figure 13:
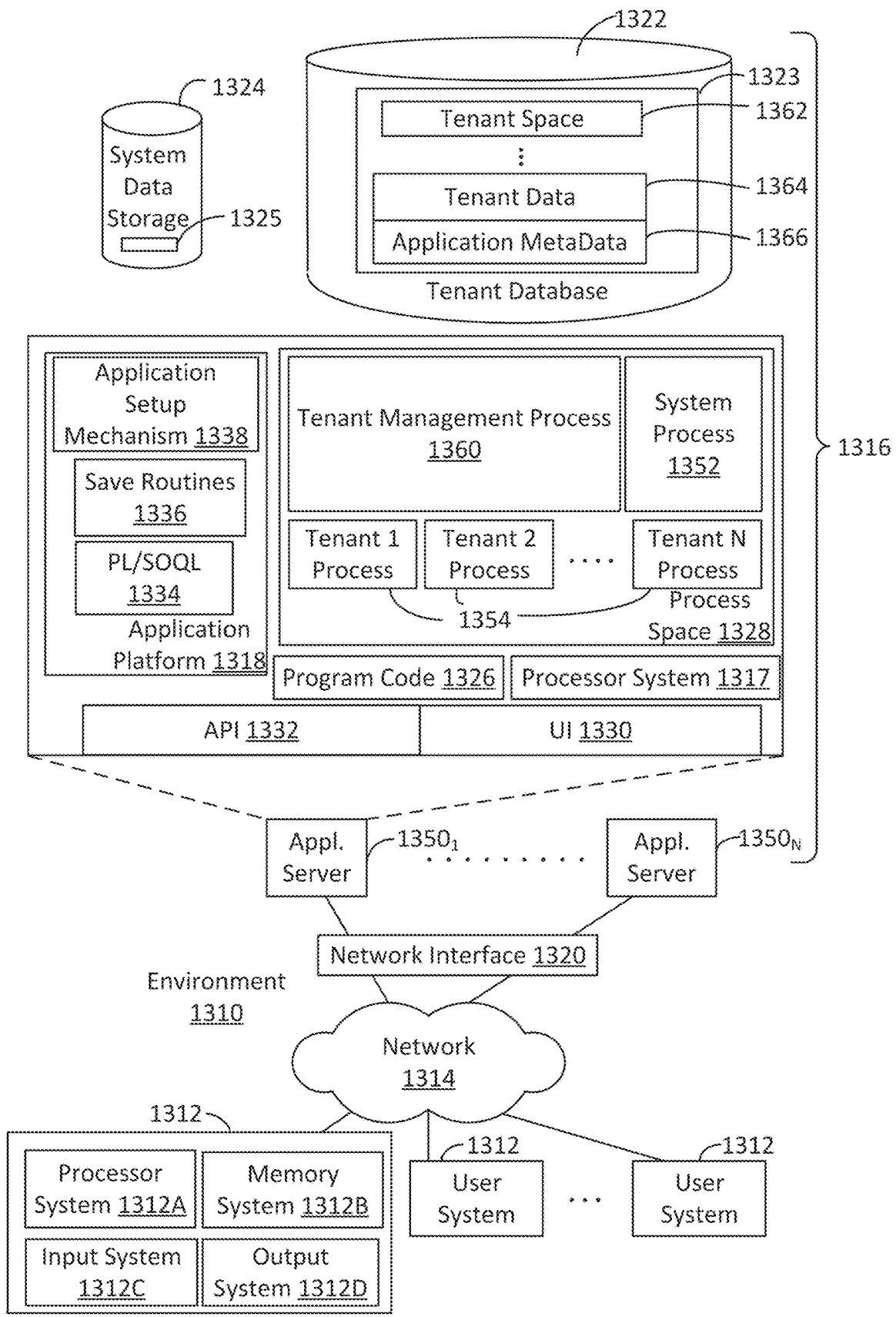
FIG. 13 shows a block diagram of an example of an environment 1310 that includes an on-demand database service configured in accordance with some implementations.

FIG. 13 shows a block diagram of an example of an environment 1310 that includes an on-demand database service configured in accordance with some implementations. Environment 1310 may include user systems 1312, network 1314, database system 1316, processor system 1317, application platform 1318, network interface 1320, tenant data storage 1322, tenant data 1323, system data storage 1324, system data 1325, program code 1326, process space 1328, User Interface (UI) 1330, Application Program Interface (API) 1332, PL/SOQL 1334, save routines 1336, application setup mechanism 1338, application servers 1350-1 through 1350-N, system process space 1352, tenant process spaces 1354, tenant management process space 1360, tenant storage space 1362, user storage 1364, and application metadata 1366. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 1316, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 1318 may be a framework that allows the creation, management, and execution of applications in system 1316. Such applications may be developed by the database service provider or by users or third-party application developers accessing the service. Application platform 1318 includes an application setup mechanism 1338 that supports application developers' creation and management of applications, which may be saved as metadata into tenant data storage 1322 by save routines 1336 for execution by subscribers as one or more tenant process spaces 1354 managed by tenant management process 1360 for example. Invocations to such applications may be coded using PL/SOQL 1334 that provides a programming language style interface extension to API 1332. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 1366 for a subscriber making such an invocation. Such system processes may also manage execution of application metadata 1366 as an application in a virtual machine.

In some implementations, each application server 1350 may handle requests for any user associated with any organization. A load balancing function (e.g., an F5 Big-IP load balancer) may distribute requests to the application servers 1350 based on an algorithm such as least-connections, round robin, observed response time, etc. Each application server 1350 may be configured to communicate with tenant data storage 1322 and the tenant data 1323 therein, and system data storage 1324 and the system data 1325 therein to serve requests of user systems 1312. The tenant data 1323 may be divided into individual tenant storage spaces 1362, which can be either a physical arrangement and/or a logical arrangement of data. Within each tenant storage space 1362, user storage 1364 and application metadata 1366 may be similarly allocated for each user. For example, a copy of a user's most recently used (MRU) items might be stored to user storage 1364. Similarly, a copy of MRU items for an entire tenant organization may be stored to tenant storage space 1362. A UI 1330 provides a user interface and an API 1332 provides an application programming interface to system 1316 resident processes to users and/or developers at user systems 1312.

System 1316 may implement a web-based digital asset management system. For example, in some implementations, system 1316 may include application servers configured to implement and execute software applications related to creation, managing, and transferring digital assets. The application servers may be configured to provide related data, code, forms, web pages and other information to and from user systems 1312. Additionally, the application servers may be configured to store information to, and retrieve information from a database system. Such information may include related data, objects, and/or Webpage content. With a multi-tenant system, data for multiple tenants may be stored in the same physical database object in tenant data storage 1322, however, tenant data may be arranged in the storage medium(s) of tenant data storage 1322 so that data of one tenant is kept logically separate from that of other tenants. In such a scheme, one tenant may not access another tenant's data, unless such data is expressly shared.

Several elements in the system shown in FIG. 13 include conventional, well-known elements that are explained only briefly here. For example, user system 1312 may include processor system 1312A, memory system 1312B, input system 1312C, and output system 1312D. A user system 1312 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 1312 to access, process and view information, pages and applications available from system 1316 over network 1314. Network 1314 may be any network or combination of networks of devices that communicate with one another, such as any one or any combination of a LAN (local area network), WAN (wide area network), wireless network, or other appropriate configuration.

The users of user systems 1312 may differ in their respective capacities, and the capacity of a particular user system 1312 to access information may be determined at least in part by "permissions" of the particular user system 1312. As discussed herein, permissions generally govern access to computing resources such as data objects, components, and other entities of a computing system, such as a digital asset management system, a social networking system, and/or a CRM database system. "Permission sets" generally refer to groups of permissions that may be assigned to users of such a computing environment. For instance, the assignments of users and permission sets may be stored in one or more databases of System 1316. Thus, users may receive permission to access certain resources. A permission server in an on-demand database service environment can store criteria data regarding the types of users and permission sets to assign to each other. For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 1316 may provide on-demand database service to user systems 1312 using an MTS arrangement. By way of example, one tenant organization may be a company that employs a sales force where each salesperson uses system 1316 to manage their sales process. Thus, a user in such an organization may maintain contact data, leads data, customer follow-up data, performance data, goals and progress data, etc., all applicable to that user's personal sales process (e.g., in tenant data storage 1322). In this arrangement, a user may manage his or her sales efforts and cycles from a variety of devices, since relevant data and applications to interact with (e.g., access, view, modify, report, transmit, calculate, etc.) such data may be maintained and accessed by any user system 1312 having network access.

When implemented in an MTS arrangement, system 1316 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 1316 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 1316 may also maintain system-level data usable by multiple tenants or other data. Such system-level data may include industry reports, news, postings, and the like that are sharable between tenant organizations.

In some implementations, user systems 1312 may be client systems communicating with application servers 1350 to request and update system-level and tenant-level data from system 1316. By way of example, user systems 1312 may send one or more queries requesting data of a database maintained in tenant data storage 1322 and/or system data storage 1324. An application server 1350 of system 1316 may automatically generate one or more SQL statements (e.g., one or more SQL queries) that are designed to access the requested data. System data storage 1324 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. In some implementations, entity tables may store information related to smart contracts and/or digital asset management. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 14A:
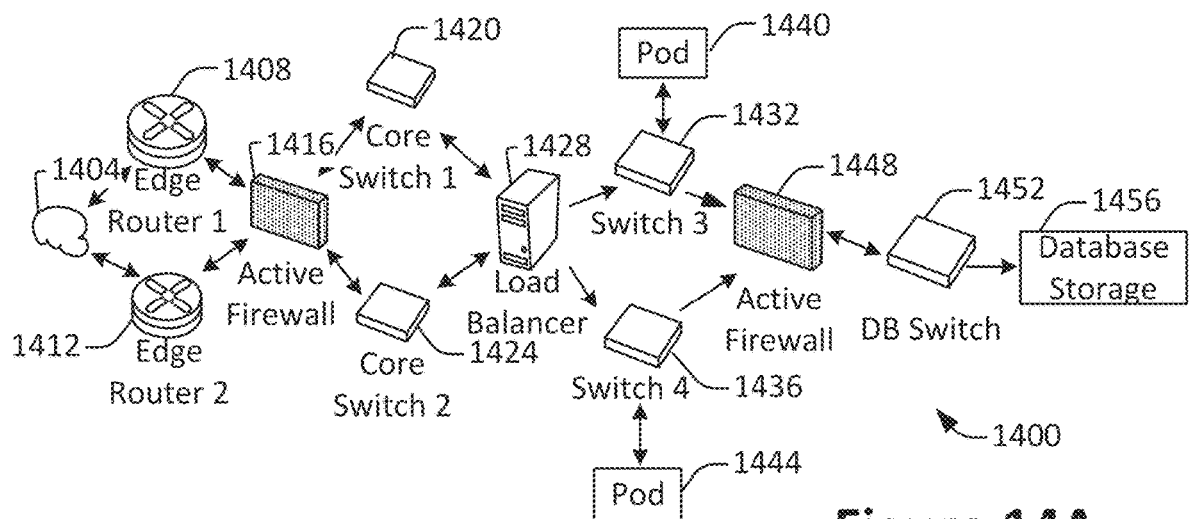
FIG. 14A shows a system diagram of an example of architectural components of an on-demand database service environment, configured in accordance with one or more embodiments.

FIG. 14A shows a system diagram of an example of architectural components of an on-demand database service environment 1400, configured in accordance with some implementations. A client machine located in the cloud 1404 may communicate with the on-demand database service environment via one or more edge routers 1408 and 1412. A client machine may include any of the examples of user systems 812 described above. The edge routers 1408 and 1412 may communicate with one or more core switches 1420 and 1424 via firewall 1416. The core switches may communicate with a load balancer 1428, which may distribute server load over different pods, such as the pods 1440 and 1444 by communication via pod switches 1432 and 1436. The pods 1440 and 1444, which may each include one or more servers and/or other computing resources, may perform data processing and other operations used to provide on-demand services. Components of the environment may communicate with a database storage 1456 via a database firewall 1448 and a database switch 1452.

Accessing an on-demand database service environment may involve communications transmitted among a variety of different components. The environment 1400 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 14A and 14B.

The cloud 1404 refers to any suitable data network or combination of data networks, which may include the Internet. Client machines located in the cloud 1404 may communicate with the on-demand database service environment 1400 to access services provided by the on-demand database service environment 1400. By way of example, client machines may access the on-demand database service environment 1400 to retrieve, store, edit, and/or process public trust ledger and/or digital asset creation, management, and transfer information.

In some implementations, the edge routers 1408 and 1412 route packets between the cloud 1404 and other components of the on-demand database service environment 1400. The edge routers 1408 and 1412 may employ the Border Gateway Protocol (BGP). The edge routers 1408 and 1412 may maintain a table of IP networks or 'prefixes', which designate network reachability among autonomous systems on the internet.

In one or more implementations, the firewall 1416 may protect the inner components of the environment 1400 from internet traffic. The firewall 1416 may block, permit, or deny access to the inner components of the on-demand database service environment 1400 based upon a set of rules and/or other criteria. The firewall 1416 may act as one or more of a packet filter, an application gateway, a stateful filter, a proxy server, or any other type of firewall.

In some implementations, the core switches 1420 and 1424 may be high-capacity switches that transfer packets within the environment 1400. The core switches 1420 and 1424 may be configured as network bridges that quickly route data between different components within the on-demand database service environment. The use of two or more core switches 1420 and 1424 may provide redundancy and/or reduced latency.

In some implementations, communication between the pods 1440 and 1444 may be conducted via the pod switches 1432 and 1436. The pod switches 1432 and 1436 may facilitate communication between the pods 1440 and 1444 and client machines, for example via core switches 1420 and 1424. Also or alternatively, the pod switches 1432 and 1436 may facilitate communication between the pods 1440 and 1444 and the database storage 1456. The load balancer 1428 may distribute workload between the pods, which may assist in improving the use of resources, increasing throughput, reducing response times, and/or reducing overhead. The load balancer 1428 may include multilayer switches to analyze and forward traffic.

In some implementations, access to the database storage 1456 may be guarded by a database firewall 1448, which may act as a computer application firewall operating at the database application layer of a protocol stack. The database firewall 1448 may protect the database storage 1456 from application attacks such as structure query language (SQL) injection, database rootkits, and unauthorized information disclosure. The database firewall 1448 may include a host using one or more forms of reverse proxy services to proxy traffic before passing it to a gateway router and/or may inspect the contents of database traffic and block certain content or database requests. The database firewall 1448 may work on the SQL application level atop the TCP/IP stack, managing applications' connection to the database or SQL management interfaces as well as intercepting and enforcing packets traveling to or from a database network or application interface.

In some implementations, the database storage 1456 may be an on-demand database system shared by many different organizations. The on-demand database service may employ a single-tenant approach, a multi-tenant approach, a virtualized approach, or any other type of database approach. Communication with the database storage 1456 may be conducted via the database switch 1452. The database storage 1456 may include various software components for handling database queries. Accordingly, the database switch 1452 may direct database queries transmitted by other components of the environment (e.g., the pods 1440 and 1444) to the correct components within the database storage 1456.

Figure 14B:
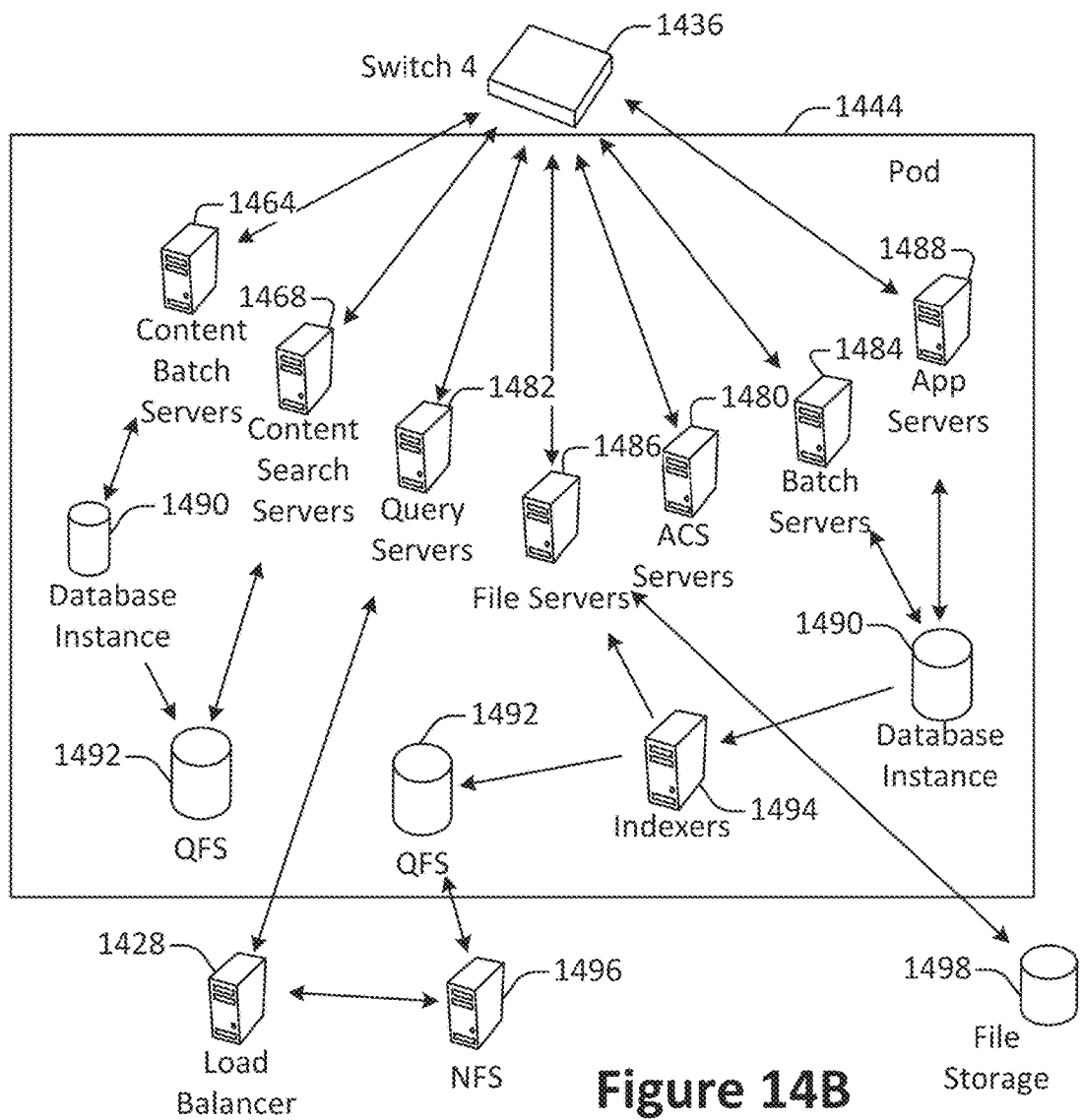
FIG. 14B shows a system diagram further illustrating an example of architectural components of an on-demand database service environment, configured in accordance with one or more embodiments.

FIG. 14B shows a system diagram further illustrating an example of architectural components of an on-demand database service environment, in accordance with some implementations. The pod 1444 may be used to render services to user(s) of the on-demand database service environment 1400. The pod 1444 may include one or more content batch servers 1464, content search servers 1468, query servers 1482, file servers 1486, access control system (ACS) servers 1480, batch servers 1484, and app servers 1488. Also, the pod 1444 may include database instances 1490, quick file systems (QFS) 1492, and indexers 1494. Some or all communication between the servers in the pod 1444 may be transmitted via the switch 1436.

In some implementations, the app servers 1488 may include a framework dedicated to the execution of procedures (e.g., programs, routines, scripts) for supporting the construction of applications provided by the on-demand database service environment 1400 via the pod 1444. One or more instances of the app server 1488 may be configured to execute all or a portion of the operations of the services described herein.

In some implementations, as discussed above, the pod 1444 may include one or more database instances 1490. A database instance 1490 may be configured as an MTS in which different organizations share access to the same database, using the techniques described above. Database information may be transmitted to the indexer 1494, which may provide an index of information available in the database 1490 to file servers 1486. The QFS 1492 or other suitable filesystem may serve as a rapid-access file system for storing and accessing information available within the pod 1444. The QFS 1492 may support volume management capabilities, allowing many disks to be grouped together into a file system. The QFS 1492 may communicate with the database instances 1490, content search servers 1468 and/or indexers 1494 to identify, retrieve, move, and/or update data stored in the network file systems (NFS) 1496 and/or other storage systems.

In some implementations, one or more query servers 1482 may communicate with the NFS 1496 to retrieve and/or update information stored outside of the pod 1444. The NFS 1496 may allow servers located in the pod 1444 to access information over a network in a manner similar to how local storage is accessed. Queries from the query servers 1422 may be transmitted to the NFS 1496 via the load balancer 1428, which may distribute resource requests over various resources available in the on-demand database service environment 1400. The NFS 1496 may also communicate with the QFS 1492 to update the information stored on the NFS 1496 and/or to provide information to the QFS 1492 for use by servers located within the pod 1444.

In some implementations, the content batch servers 1464 may handle requests internal to the pod 1444. These requests may be long-running and/or not tied to a particular customer, such as requests related to log mining, cleanup work, and maintenance tasks. The content search servers 1468 may provide query and indexer functions such as functions allowing users to search through content stored in the on-demand database service environment 1400. The file servers 1486 may manage requests for information stored in the file storage 1498, which may store information such as documents, images, basic large objects (BLOBs), etc. The query servers 1482 may be used to retrieve information from one or more file systems. For example, the query system 1482 may receive requests for information from the app servers 1488 and then transmit information queries to the NFS 1496 located outside the pod 1444. The ACS servers 1480 may control access to data, hardware resources, or software resources called upon to render services provided by the pod 1444. The batch servers 1484 may process batch jobs, which are used to run tasks at specified times. Thus, the batch servers 1484 may transmit instructions to other servers, such as the app servers 1488, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 15:
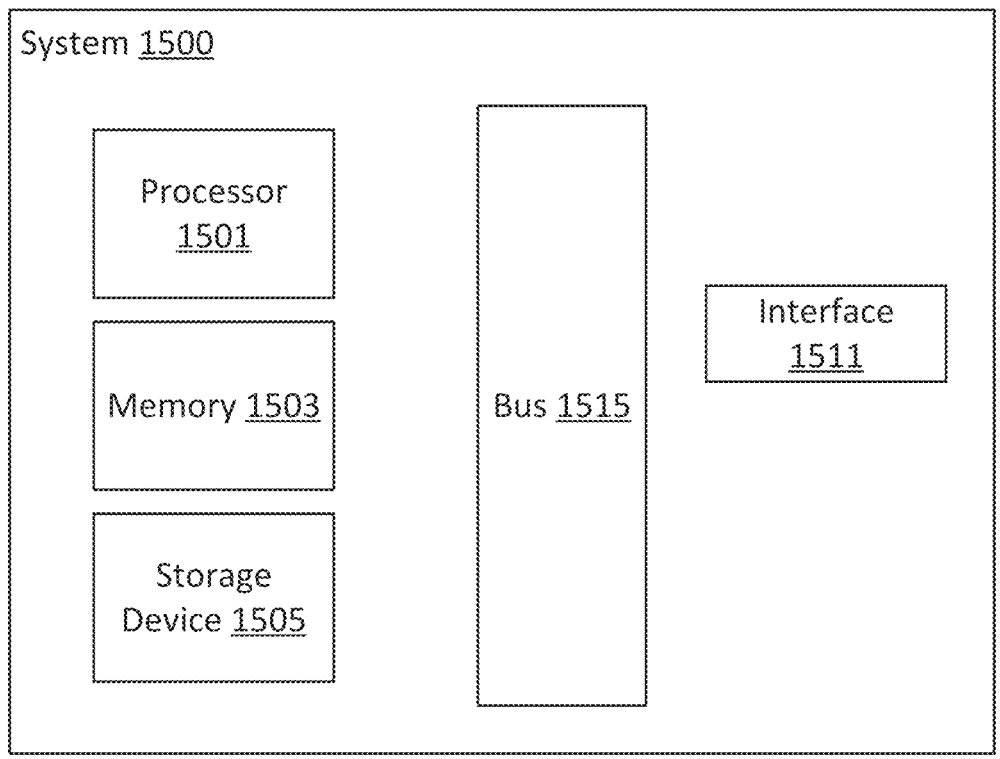
FIG. 15 illustrates one example of a computing device, configured in accordance with one or more embodiments.

FIG. 15 illustrates one example of a computing device, configured in accordance with one or more embodiments. According to various embodiments, a system 1500 suitable for implementing embodiments described herein includes a processor 1501, a memory module 1503, a storage device 1505, an interface 1511, and a bus 1515 (e.g., a PCI bus or other interconnection fabric.) System 1500 may operate as variety of devices such as an application server, a database server, or any other device or service described herein. Although a particular configuration is described, a variety of alternative configurations are possible. The processor 1501 may perform operations such as those described herein. Instructions for performing such operations may be embodied in the memory 1503, on one or more non-transitory computer readable media, or on some other storage device. Various specially configured devices can also be used in place of or in addition to the processor 1501. The interface 1511 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Figure 16:
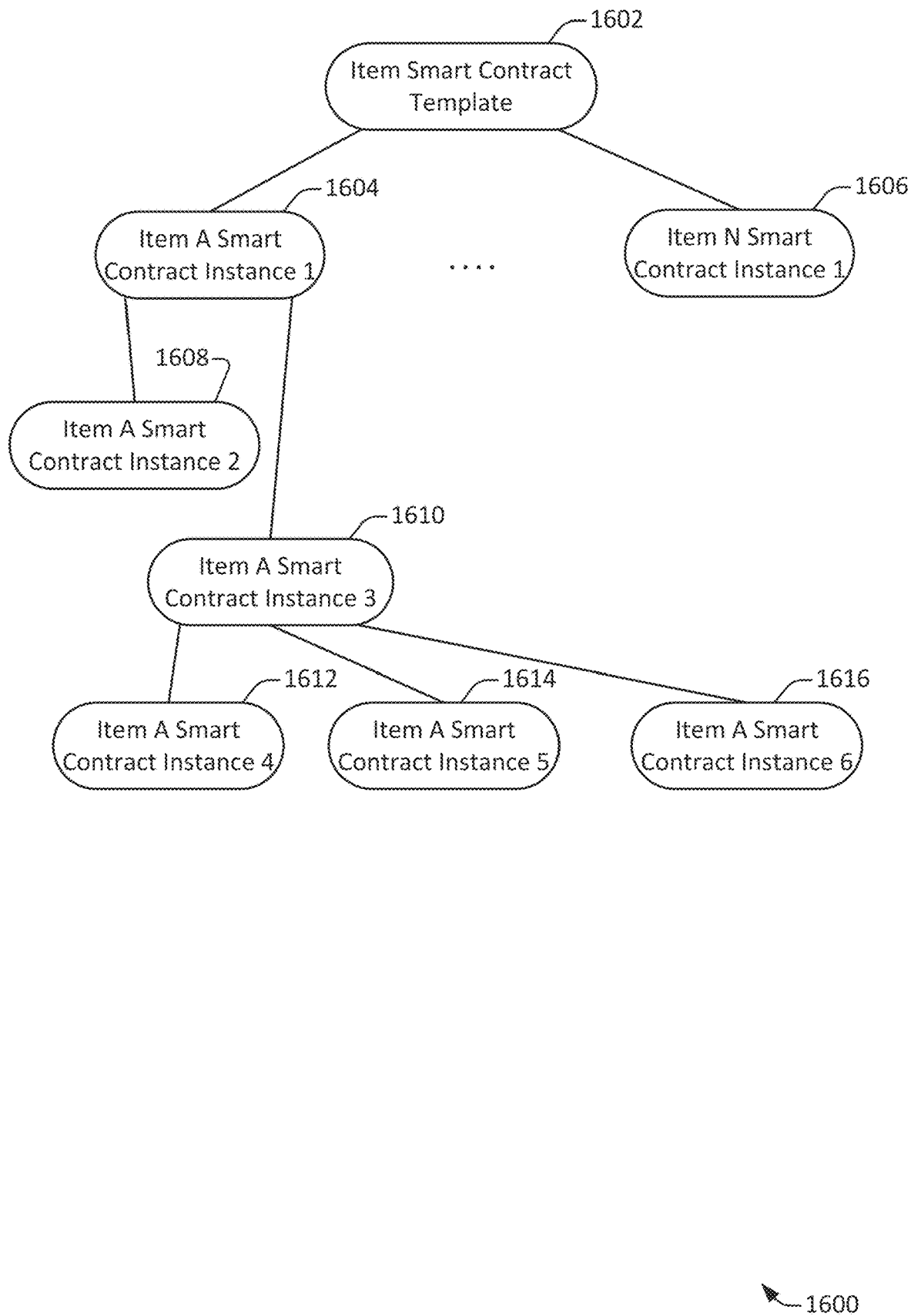
FIG. 16 illustrates an example of a smart contract chain, configured in accordance with one or more embodiments.

FIG. 16 illustrates an example of a smart contract chain 1600, configured in accordance with one or more embodiments. The smart contract chain 1600 may be configured so as to link various smart contract templates and instances in child-parent relationships. In this way, a single smart contract instance or template may be used as a starting point to identify other related smart contract instances or templates.

The smart contract chain 1600 includes a root node 1602, which is an item smart contract template. The item smart contract template 1602 is a smart contract template for creating a particular type of item, such as a fungible or non-fungible token. Various instances of the smart contract template 1602 may be created, such as the item A smart contract instance 11604 through the item N smart contract instance 1606.

According to various embodiments, the top level item smart contract instances may be linked to the item smart contract template 1602 in one or more parent-child relationships. Such relationships may be maintained by, for example, one or more smart contract references stored within a smart contract. For instance, a smart contract template or instance may store within it one or more references to child or parent smart contract templates or instances.

The smart contract chain includes the item A smart contract instances 1608, 1610, 1612, 1614, and 1616. Each of these smart contract instances may include one or more references to their respective parent smart contract instances and/or one or more child smart contract instances.

According to various embodiments, smart contract chaining may be used to subdivide various rights associated with a digital asset. For example, the smart contract template 1602 may be used to generate digital tokens associated with rights related to a digital asset. The item A smart contract instance 1604 is one example of such a smart contract, and when created may include a number of different tokens. Ownership of such tokens may provide different rights related to the digital asset, such as ownership of the digital asset, copyright to the digital asset, the right to modify the digital asset, the right to transfer ownership of the digital asset, the right to transfer one or more other rights to the digital asset, or any other relevant rights.

According to various embodiments, the original owner of the digital asset "item A" may subsequently transfer one or more of the rights that the owner originally possesses. For instance, the original owner may transfer ownership of the digital asset to one party, and various rights related to the digital asset to a different party. That party may then transfer those various rights to other, different, parties. Such complex transfers may result in a chain of smart contracts presented as shown in FIG. 16.

According to various embodiments, smart contract chaining may affect the transfer of tokens relating to digital assets. For example, when a token is transferred, executing the smart contract may involve creating a new instance of a smart contract template that reflects the updated ownership of the token. The new instance of the smart contract may include a reference to the smart contract instance associated with the previous owner. Additionally, the smart contract instance associated with the previous owner may be updated to include a reference to the new instance of the smart contract.

According to various embodiments, smart contract chaining may affect the process for identifying an owner of a right pertaining to a digital asset. For instance, when a request is received to identify one or more rights related to a token included in a smart contract instance such as the smart contract instance 5 1614 shown in FIG. 16, references to other smart contracts within the chain may be navigated to identify those other smart contracts as well as the owners of those smart contracts. In this way, a user may determine not only the owner of a particular right related to a digital asset, but also the owners of other rights related to the same digital asset.

In particular embodiments, smart contract chaining and/or smart contract token aggregation may be used to support applications such as event tickets. For instance, a smart contract template may be used to generate multiple individual smart contract instances that each correspond to a ticket for an event. Then, additional instances linked to these top level instances may provide for additional rights or privileges, such as access to restricted areas within an event space, signatures from performers, or other such add-ons.

In particular embodiments, smart contract chaining and/or smart contract token aggregation may be used to support applications such as a digital economy within a virtual environment such as a video game. For instance, a smart contract template may be used to define characteristics of the digital token and then generate multiple individual smart contract instances that each correspond to one or more individual tokens. Then, additional instances linked to these top level instances may be used to support lending and collecting interest on tokens.

FIG. 17 illustrates an example of a smart contract 1700, configured in accordance with one or more embodiments. According to various embodiments, the smart contract 1700 may be used to record transactions related to digital assets in a public trust ledger. The smart contract 1700 includes a public key 1702, a private key 1704, a transaction interface 1706, an owner ID 1708, a smart contract ID list 1710, one or more item tokens 1712, and smart contract metadata 1720.

In some implementations, the smart contract 1700 is a computer program that may be included within a public trust ledger such as a blockchain. The smart contract 1700 may then be executed to perform one or more operations, accessible via the transaction interface 1706. Such transactions may include, but are not limited to: transferring ownership of one or more item tokens 1712, providing one or more entries on the smart contract id list 1710, and identifying the owner 1708.

According to various embodiments, a smart contract may be implemented as a template and one or more instances of the template. For example, a template may be created for a particular type of token. Then, an instance of the smart contract template may be used to store some quantity of the token. For example, an instance of a smart contract may store one or more NFTs of a particular type and owned by a particular account. As another example, an instance of a smart contract template may store a quantity of a fungible token of a particular type and owned by a particular account.

An instance of a smart contract template may be identified by, for example, an execution ID.

According to various embodiments, the smart contract elements 1702-1720 may be substantially similar to the smart contract elements 502-520 shown in FIG. 5. Additionally, the smart contract 1700 may be implemented in compliance with a standard that allows for tokens of different types to be included within the same smart contract. An example of such a standard is the ERC-1155 standard associated with the Ethereum blockchain. For instance, in FIG. 5, the item token 1712 may have one token type 1718, while another item token 1722 may have another token type 1728. As with the item token 1712, the item token 1722 may include a token ID 1724 and a digital asset ID 1726.

According to various embodiments, a single smart contract instance may be created that includes potentially many different NFTs associated with many different digital assets. The different NFTs may be associated with the same token type (e.g., ownership of a digital asset) or may be associated with different token types. For example, some of the NFTs may be associated with digital asset ownership, while others may be associated with ownership of various rights related to a respective digital asset. As another example, a digital asset such as a virtual clothing outfit for a virtual avatar may itself be composed of sub-assets, such as different tokens for each of the outfit's shirt, pants, socks, and shoes.

According to various embodiments, including more than one token or token type in the same smart contract may allow for more efficient transaction recordation. For example, rather than creating a separate smart contract instance and separate transaction for each NFT, a single smart contract may be created with many different NFTs in a single transaction. Similarly, different but potentially related NFTs, such as a token for ownership of a digital asset and one or more additional tokens associated with rights pertaining to the digital asset, may be stored within the same smart contract and transferred by executing that smart contract.

FIG. 18 illustrates an example of a smart contract 1800, configured in accordance with one or more embodiments. According to various embodiments, the smart contract 1800 may be used to record transactions related to digital assets in a public trust ledger. The smart contract 1800 includes a public key 1802, a private key 1804, a transaction interface 1806, an owner ID 1808, a smart contract ID list 1810, one or more item tokens 1812, and smart contract metadata 1820.

In some implementations, the smart contract 1800 is a computer program that may be included within a public trust ledger such as a blockchain. The smart contract 1800 may then be executed to perform one or more operations, accessible via the transaction interface 1806. Such transactions may include, but are not limited to: transferring ownership of one or more item tokens 1812, providing one or more entries on the smart contract id list 1810, and identifying the owner 1808.

According to various embodiments, a smart contract may be implemented as a template and one or more instances of the template. For example, a template may be created for a particular type of token. Then, an instance of the smart contract template may be used to store some quantity of the token. For example, an instance of a smart contract may store one or more NFTs of a particular type and owned by a particular account. As another example, an instance of a smart contract template may store a quantity of a fungible token of a particular type and owned by a particular account. An instance of a smart contract template may be identified by, for example, an execution ID.

According to various embodiments, the smart contract elements 1802-1820 may be substantially similar to the smart contract elements 502-520 shown in FIG. 5. Additionally, the smart contract 1800 may be implemented in such a way to include one or more modifiable values 1822-1824 within the smart contract metadata 1820. In particular embodiments, such features may be used in conjunction with those discussed with respect to the FIG. 17.

In some implementations, the transaction interface 1806 may support the modification of one or more of the metadata values 1822-1824. For example, after authenticating to a wallet in which the smart contract 1800 is stored, a user may update one or more of the values 1822-1824. When a value is updated, it may be stored within the public trust ledger so that it may be accessed and identified by anyone who possesses an appropriate identifier, such as the identifier that uniquely identifies the smart contract 1800.

In some configurations, a value may be continuous, such as an integer. Alternatively, a value may be constrained to a set of possible values. For example, a value may be constrained to be either True or False (or one or zero). As another example, a value may be constrained to be one of a discrete set of values (e.g., the colors red, green, blue, or yellow).

According to various embodiments, a smart contract metadata value may be accessed and used in any of a variety of different ways. For example, a smart contract associated with an NFT identifying an article of virtual clothing such as a shirt may be updated to change a value identifying the color of the shirt. When the value is updated, the shirt color of a digital avatar associated with the NFT may change accordingly. Additional details regarding such operations are discussed with respect to the method 2000 shown in FIG. 20.

FIG. 19 illustrates a system 1900 in which a digital asset 1902 is associated with a number of different smart contracts, including the smart contracts 1904, 1910, and 1914. The smart contracts include the modifiable values 1906, 1908, 1916, and 1918. These values may be modified by the owners of the smart contracts as discussed with respect to the FIGS. 18 and 20.

As one example, the digital asset 1902 may represent a virtual outfit associated with a digital avatar. Each of the values may then represent a color associated with a portion of the virtual outfit, such as the pants, shoes, hat, shirt, and socks. The digital asset may be displayed in various ways, such as on a digital billboard, on a website, within a game, or within another type of virtual environment. The digital asset may be displayed based on the values stored in the smart contracts. For example, a user may update one of the values to change the virtual avatar's shirt color from blue to red.

In particular embodiments, the digital asset 1902 may itself be associated with a smart contract. Then, the smart contracts 1904, 1910, and 1914 may be linked to the smart contract associated with the digital asset 1902 via chaining or aggregation.

FIG. 20 illustrates a digital asset value modification method 2000, performed in accordance with one or more embodiments. According to various embodiments, the method 2000 may be performed in order to update a value stored in a smart contract, as discussed with respect to FIGS. 18 and 19. The method 2000 may be performed at any suitable computing device capable of interfacing with a public trust ledger. For instance, the method 2000 may be performed at the client node 212 shown in FIG. 2.

A request to modify an existing value in a smart contract associated with a digital asset is received at 2002. The request is authenticated at 2004. A determination is made at 2006 as to whether the authentication was successful. According to various embodiments, the request may be received from a client machine. The client machine may authenticate via a suitable authentication protocol, as discussed, for example, with respect to FIG. 5. The authentication process may identify the source of the communication as the owner of a wallet associated with a public trust ledger and in which the smart contract is stored.

When it is determined that the authentication request was successful, then a replacement value is identified at 2008. In some implementations, the replacement value may be included in the request received at 2002. Alternatively, the replacement value may be determined in some other fashion. For instance, the replacement value may be provided by the database system.

A determination is made at 2010 as to whether the replacement value is permissible. According to various embodiments, the value may be constrained in any of various ways. For example, the value may be constrained to be an integer, a string of characters, a binary value, a Boolean value, a real number, or some other type of data. As another example, the value may be constrained to be one of a set of discrete values, such as a color from a list of acceptable colors. As yet another example, the value may be constrained to be from a particular class of values, such as even integers.

According to various embodiments, the determination made at 2020 may be made in any of various ways. In some implementations, the smart contract itself may include programming logic capable of evaluating a candidate replacement value to determine whether the candidate replacement value is permissible. Alternatively, or additionally, other types of verification may be employed. For instance, the smart contract may query an oracle, such as the database system, to determine whether the candidate replacement value is permissible.

If it is determined that the replacement value is permissible, then at 2012 the smart contract is executed to replace the existing value with the replacement value. The replacement value is recorded in the public trust ledger at 2014. Accordingly, the replacement value may be made publicly available such that it may be queried by the owner of the smart contract, the database system, and/or one or more third parties. The replacement value may then be used to, for example, determine a state associated with a digital asset, as discussed with respect to the method 2100 shown in FIG. 21.

Figure 21:
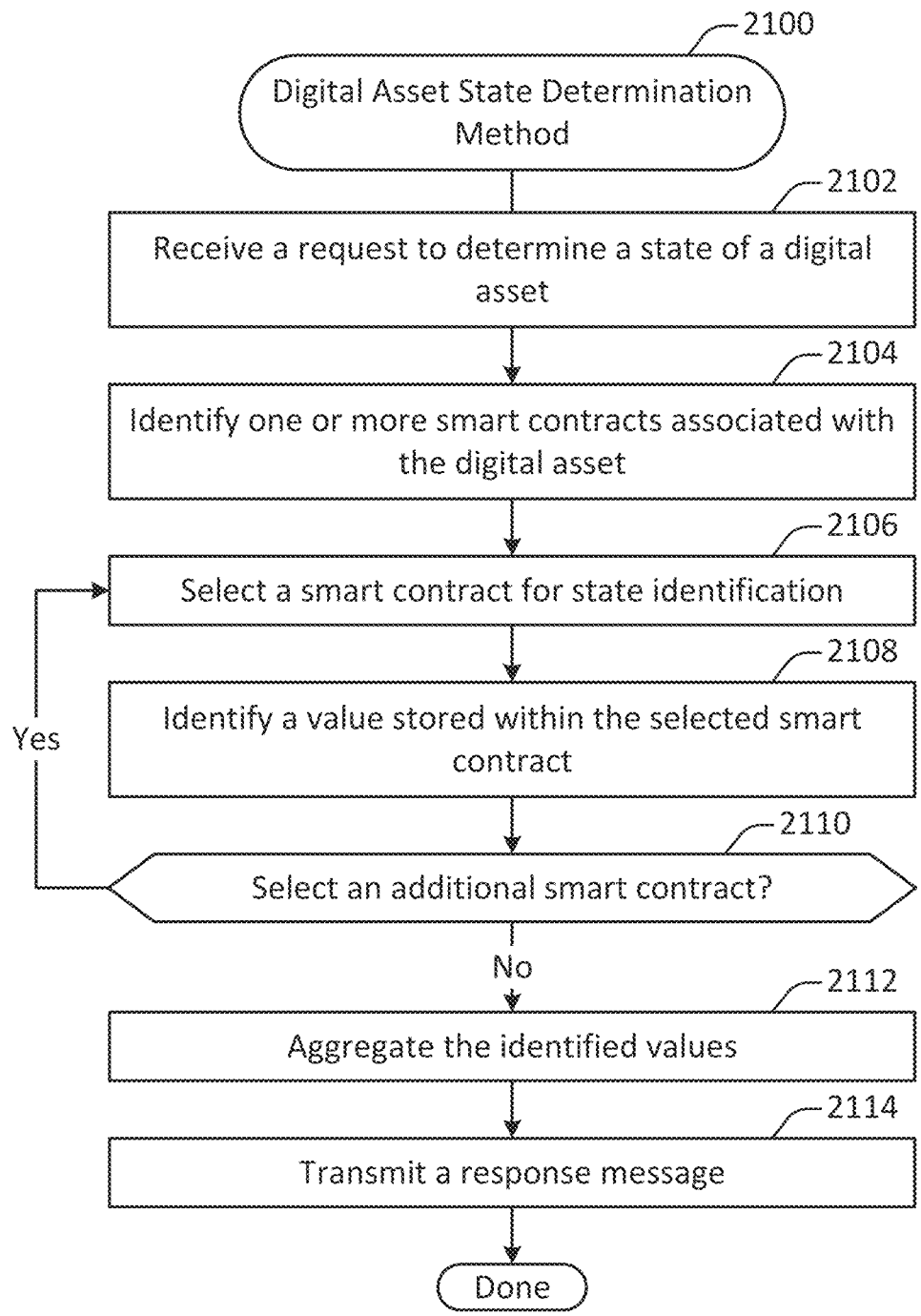
FIG. 21 illustrates a digital asset state determination method, performed in accordance with one or more embodiments.

FIG. 21 illustrates a digital asset state determination method 2100, performed in accordance with one or more embodiments. According to various embodiments, the method 2100 may be performed in order to identify and aggregate one or more values stored in a public trust ledger, such as the values discussed with respect to FIG. 19, FIG. 20, and FIG. 21. The method 2100 may be performed at any suitable computing device capable of interfacing with a public trust ledger. For instance, the method 2100 may be performed at the client node 212 shown in FIG. 2, or at a different computing device in communication with such a client node.

In particular embodiments, all or a portion of the method 2100 may be embodied in a smart contract. For example, a smart contract may expose a method that facilitates the identification of a state of a digital asset. For instance, the method 2100 may be embodied in a smart contract associated with the digital asset 1902 shown in FIG. 19. In such a configuration, executing the smart contract may involve operations such as communicating with other smart contracts, such as the smart contracts 1904, 1910, and 1914 shown in FIG. 19.

A request to determine a state of a digital asset is received at 2102. According to various embodiments, the request may be received as part of a procedure related to the digital asset. For example, the request may be generated as part of a procedure to update or generate a view of a digital avatar. The request may be generated by any suitable party. For instance, because information stored in a public trust ledger is publicly available, the request may be generated by the database system, by an owner of all or a portion of the digital asset, or by a third party.

One or more smart contracts associated with the digital asset are identified at 2104. According to various embodiments, one or more of a variety of contract identification techniques may be used. For example, a database system may maintain a list of smart contracts associated with a digital asset. As another example, a smart contract template may include references to instances of smart contracts that implement the smart contract template. As yet another example, one or more smart contracts may be linked together by the chaining principle, as discussed with respect to FIG. 16. When a smart contract is identified, a smart contract identifier that uniquely identifies the smart contract within the public trust ledger may be determined.

A smart contract is selected for state identification at 2106. According to various embodiments, the smart contracts may be selected in any suitable order. For instance, the smart contracts may be selected for state identification in sequence, in parallel, and/or based on any suitable selection or ordering criteria.

A value stored within the selected smart contract is identified at 2108. According to various embodiments, the value may be identified by accessing the public trust ledger to return the value. For instance, the public trust ledger may be accessed by the client node 212 shown in FIG. 2. The identification process may involve querying the public trust ledger to identify the smart contract associated with a unique identifier determined during the identification at operation 2104.

A determination is made at 2110 as to whether to select an additional smart contract for analysis. According to various embodiments, the determination may be made based on whether additional smart contracts identified at 2104 are yet to be queried. Alternatively, another type of determination criterion may be used. For instance, in the event that the smart contract values are used to determine a composite value, such as a most common value, then not every related smart contract need be queried so long as the conditions for determining the composite value are met.

The identified values are aggregated at 2112. In some implementations, aggregating the identified values may involve constructing a response message that includes the values. Alternatively, or additionally, the values may be processed, for instance to determine one or more composite or derived values.

In some implementations, the method 2100 may be used to combine values stored in two or more smart contracts associated with a digital asset. For example, a parameter such as a color of a digital asset may be determined based on voting, and the voting may be conducted by setting parameters in various smart contracts associated with the digital asset. In such a configuration, the values identified at 2108 may be aggregated to determine a most common value, which may then be returned as the winner of the vote.

A response message is transmitted at 2114. In some configurations, the response message may include the values identified at 2108. Alternatively, or additionally, the response message may include other information, as discussed with respect to the operation 2112.

Figure 22:
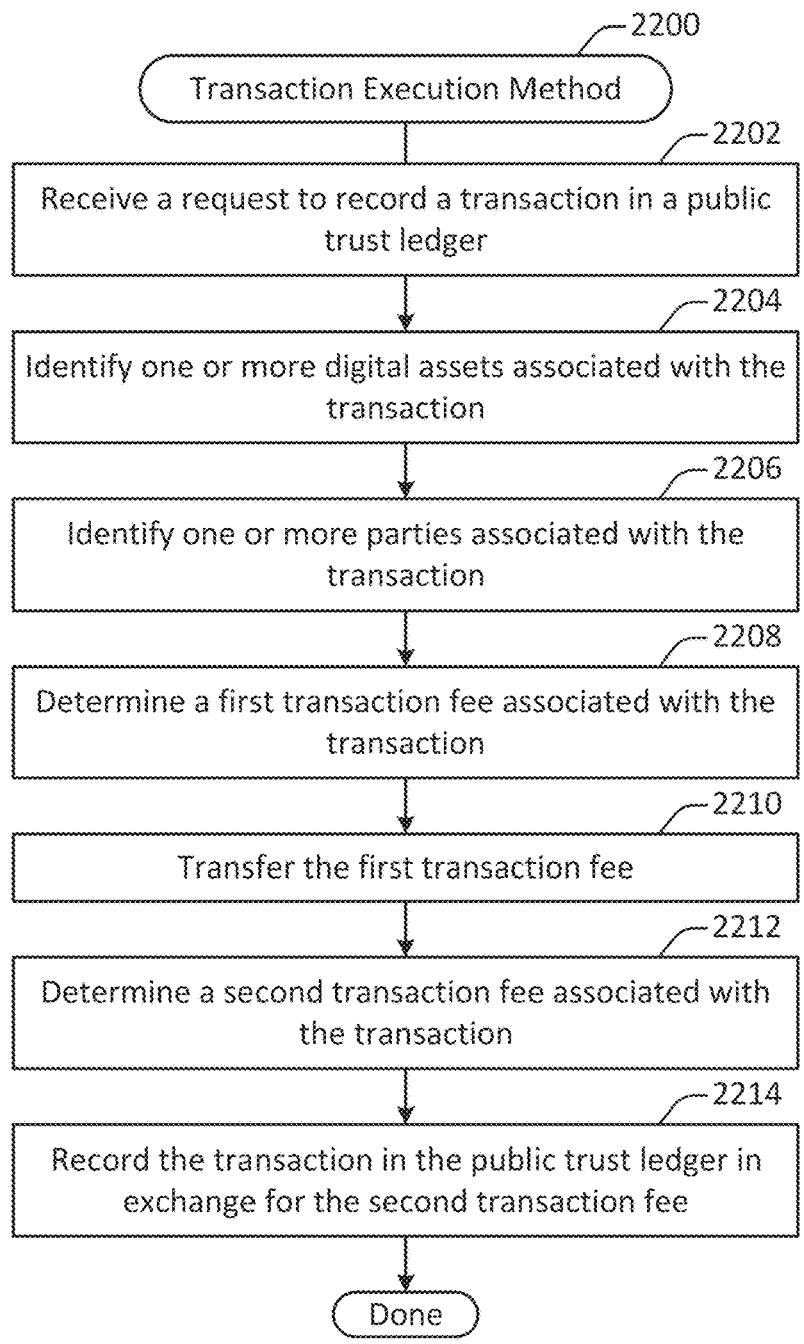
FIG. 22 illustrates a transaction execution method, performed in accordance with one or more embodiments.

FIG. 22 illustrates a transaction execution method 2200, performed in accordance with one or more embodiments. According to various embodiments, the method 2200 may be performed at a database system in communication with a public trust ledger. For example, the method 2200 may be performed at one or more computing devices shown in the FIGS. 13, 14A, and 14B.

A request is received at 2202 to record a transaction in a public trust ledger. According to various embodiments, the request may be received in association with various methods described herein. For example, transactions may be recorded in a public trust ledger as described with respect to the creation of a digital asset as discussed with respect to the method 600 shown in FIG. 6, the transfer of a token related to a digital asset as discussed with respect to the methods 900 and 1000 shown in FIG. 9 and FIG. 10, or any other suitable method.

One or more digital assets associated with the transaction are identified at 2204. According to various embodiments, identifying a digital asset may involve identifying any or all relevant information. Such information may include, but is not limited to: a digital asset ID, a digital asset type, and/or content such as metadata related to the digital asset.

One or more parties associated with the transaction is identified at 2206. According to various embodiments, identifying a party may involve determining any relevant identifying information. For example, a party may be an entity such as an organization accessing computing services via the on-demand database system. As another example, a party may be an end user within the on-demand database system. As yet another example, a party may be located outside the on-demand database system.

According to various embodiments, a party may be associated with the transaction in any of various ways. For example, a party may be a transferor or recipient of the digital asset. As another example, a party may be a creator of the digital asset.

In particular embodiments, identifying a party associated with the transaction may involve determining a class or type associated with a party. For instance, different types of entities within the on-demand database system may be associated with different transaction fees. Such information may be determined by retrieving it from within the on-demand database system.

In some implementations, information identified at 2204 and/or 2206 may be included with the request received at 2202. Alternatively, or additionally, information may be identified via other means. For example, information identifying the digital assets and/or parties may be located by accessing a database table and/or a public trust ledger to retrieve information stored therein.

A first transaction fee associated with the transaction is identified at 2208. The first transaction fee is transferred at 2210. According to various embodiments, the first transaction fee may be the price paid by one or more of the parties to the database system to record the transaction. The first transaction may be paid, for instance, directly to the database system. The fee may be paid in any suitable currency, including conventional currencies, cryptocurrencies, or some combination thereof.

In some implementations, the first transaction fee may be identified at least in part by consulting the public trust ledger. In such a configuration, a first transaction fee for a particular asset type, asset, party, or party type may be recorded within a smart contract in the public trust ledger. For example, a first transaction fee may be stored in metadata within a smart contract recorded in the public trust ledger. The smart contract in which the first transaction fee is stored may be linked to smart contracts to which the first transaction fee applies by the chaining principle, discussed with respect to FIG. 16, and/or as an instantiation of a smart contract template.

According to various embodiments, the first transaction fee may be determined in some other way. For example, the first transaction fee may be determined by accessing configuration information associated with a smart contract template. As another example, the first transaction fee may be determined by accessing an oracle, which is a source of truth accepted by the public trust ledger. In some configurations, the database system may act as an oracle for providing relevant information.

A second transaction fee associated with the transaction is determined at 2212. According to various embodiments, the second transaction fee may be the price paid by the database system to one or more public trust ledger miners to record the transaction. The second transaction fee may be less than, greater than, or equal to the first transaction fee. The second transaction fee may be determined based on the state of the public trust ledger, for which transaction fees may be fixed or may change over time. In particular embodiments, the database system may reduce the second transaction fee by grouping together multiple transfers in the same public trust ledger transaction.

The transaction is recorded in the public trust ledger in exchange for the second transaction fee. According to various embodiments, transactions may be recorded in various ways. In some configurations, a miner may need to solve a cryptographic puzzle in order to record the transaction. Alternatively, or additionally, the transaction may be recorded based on proof-of-stake.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted.

Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of disclosed herein apply to a wide variety of computing environments. Particular embodiments may be implemented without some or all of the specific details described herein. In other instances, well known process operations have not been described in detail in order to avoid unnecessarily obscuring the disclosed techniques. Accordingly, the breadth and scope of the present application should not be limited by any of the implementations described herein, but should be defined only in accordance with the claims and their equivalents.

The invention claimed is:

1. A method comprising:
    receiving via a communication interface a request to access a digital asset uniquely identified by an identifier within an on-demand database system configured to provide computing services to a plurality of entities via the internet, ownership of the digital asset being determined based on ownership of a parent smart contract recorded in a public trust ledger, the on-demand database system storing one or more database records reflecting the ownership of the parent smart contract;
    identifying via a processor a plurality of children smart contracts recorded in the public trust ledger, each of the children smart contracts being linked with the parent smart contract in a respective parent-child relationship;
    determining via the processor a first state for a first modifiable value of a plurality of modifiable values, the first modifiable value being stored within a first child smart contract of the plurality of children smart contracts within the public trust ledger, the first child smart contract including computer programming code providing a first self-executing agreement for transferring a first non-fungible token linked with the parent smart contract, permission to update the first modifiable value being linked to ownership of the first non-fungible token;
    updating a second state for a second modifiable value of the plurality of modifiable values, the second modifiable value being stored within a second child smart contract of the plurality of children smart contracts within the public trust ledger, the second child smart contract including computer programming code providing a second self-executing agreement for transferring a second non-fungible token linked with the parent smart contract, permission to update the second modifiable value being linked to ownership of the second non-fungible token; and
    transmitting a response message via the communication interface providing access to a visual representation of the digital asset, the visual representation of the digital asset reflecting the respective states for the two or more modifiable values including the first modifiable value and the second modifiable value.

2. The method recited in claim 1, wherein a first one of the plurality of related smart contracts is linked with the designated smart contract via smart contract chaining.

3. The method recited in claim 1, wherein a first one of the plurality of related smart contracts includes a reference to the designated smart contract, and wherein the designated smart contract includes a reference to the first related smart contract.

4. The method recited in claim 1, wherein a first one of the plurality of related smart contracts includes a first non-fungible token having a first non-fungible token type and a second non-fungible token having a second non-fungible token type.

5. The method recited in claim 1, wherein a first one of the plurality of related smart contracts is included in a public trust ledger wallet owned by a first public trust ledger account, and wherein a second one of the plurality of related smart contracts is included in a public trust ledger wallet owned by a second public trust ledger account, the first and second public trust ledger accounts being different.

6. The method recited in claim 1, wherein the designated smart contract is a digital avatar, and wherein each of the two or more modifiable values represents a respective visual attribute of the digital avatar.

7. The method recited in claim 1, the method further comprising:
    determining a most common value among the plurality of modifiable values, wherein the representation of the digital asset reflects the most common value.

8. The method recited in claim 1, wherein the designated smart contract includes a private key and a public key that together facilitate encrypted communication with the smart contract via a public key encryption protocol.

9. The method recited in claim 1, wherein updating a first one of the modifiable values comprises executing a smart contract to record an updated value in the public trust ledger.

10. The method recited in claim 1, wherein the public trust ledger is publicly accessible outside the on-demand database system.

11. The method recited in claim 1, wherein the public trust ledger is a blockchain.

12. The method recited in claim 11, wherein the blockchain is Ethereum.

13. The method recited in claim 1, wherein the on-demand database system includes a multitenant database, and wherein two or more of the plurality of entities are tenants within the multitenant database.

14. An on-demand database system implemented on a computing system, the database system comprising:
    a communication interface configured to receive a request to access a digital asset uniquely identified by an identifier within an on-demand database system configured to provide computing services to a plurality of entities via the internet, ownership of the digital asset being determined based on ownership of a parent smart contract recorded in a public trust ledger, the on-demand database system storing one or more database records reflecting the ownership of the parent smart contract;
    a processor configured to:
        identify a plurality of children smart contracts recorded in the public trust ledger, each of the children smart contracts being linked with the parent smart contract in a respective parent-child relationship,
        determine a first state for a first modifiable value of a plurality of modifiable values, the first modifiable value being stored within a first child smart contract of the plurality of children smart contracts within the public trust ledger, the first child smart contract including computer programming code providing a first self-executing agreement for transferring a first non-fungible token linked with the parent smart contract, permission to update the first modifiable value being linked to ownership of the first non-fungible token, update a second state for a second modifiable value of the plurality of modifiable values, the second modifiable value being stored within a second child smart contract of the plurality of children smart contracts within the public trust ledger, the second child smart contract including computer programming code providing a second self-executing agreement for transferring a second non-fungible token linked with the parent smart contract, permission to update the second modifiable value being linked to ownership of the second non-fungible token, wherein the communication interface is further configured to transmit a response message providing access to a visual representation of the digital asset, the visual representation of the digital asset reflecting the respective states for the two or more modifiable values including the first modifiable value and the second modifiable value.

15. The on-demand database system recited in claim 14, wherein a first one of the plurality of related smart contracts is linked with the designated smart contract via smart contract chaining.

16. The on-demand database system recited in claim 14, wherein a first one of the plurality of related smart contracts includes a reference to the designated smart contract, and wherein the designated smart contract includes a reference to the first related smart contract.

17. The on-demand database system recited in claim 14, wherein a first one of the plurality of related smart contracts includes a first non-fungible token having a first non-fungible token type and a second non-fungible token having a second non-fungible token type.

18. The on-demand database system recited in claim 14, wherein a first one of the plurality of related smart contracts is included in a public trust ledger wallet owned by a first public trust ledger account, and wherein a second one of the plurality of related smart contracts is included in a public trust ledger wallet owned by a second public trust ledger account, the first and second public trust ledger accounts being different.

19. One or more non-transitory computer readable media having instructions stored thereon for performing a method, the method comprising:

receiving via a communication interface a request to access a digital asset uniquely identified by an identifier within an on-demand database system configured to provide computing services to a plurality of entities via the internet, ownership of the digital asset being determined based on ownership of a parent smart contract recorded in a public trust ledger, the on-demand database system storing one or more database records reflecting the ownership of the parent smart contract;

identifying via a processor a plurality of children smart contracts recorded in the public trust ledger, each of the children smart contracts being linked with the parent smart contract in a respective parent-child relationship;

determining via the processor a first state for a first modifiable value of a plurality of modifiable values, the first modifiable value being stored within a first child smart contract of the plurality of children smart contracts within the public trust ledger, the first child smart contract including computer programming code providing a first self-executing agreement for transferring a first non-fungible token linked with the parent smart contract, permission to update the first modifiable value being linked to ownership of the first non-fungible token;

updating a second state for a second modifiable value of the plurality of modifiable values, the second modifiable value being stored within a second child smart contract of the plurality of children smart contracts within the public trust ledger, the second child smart contract including computer programming code providing a second self-executing agreement for transferring a second non-fungible token linked with the parent smart contract, permission to update the second modifiable value being linked to ownership of the second non-fungible token; and transmitting a response message via the communication interface providing access to a visual representation of the digital asset, the visual representation of the digital asset reflecting the respective states for the two or more modifiable values including the first modifiable value and the second modifiable value.

\* \* \* \* \*